United States Patent
Lee

(10) Patent No.: US 10,522,056 B2
(45) Date of Patent: Dec. 31, 2019

(54) IMPACT-DRIVEN TRAUMATIC BRAIN INJURY TESTING APPARATUS

(71) Applicant: Choon Kee Lee, Denver, CO (US)

(72) Inventor: Choon Kee Lee, Denver, CO (US)

( * ) Notice: Subject to any disclaimer, the term of this patent is extended or adjusted under 35 U.S.C. 154(b) by 193 days.

(21) Appl. No.: 15/232,799

(22) Filed: Aug. 9, 2016

(65) Prior Publication Data
US 2018/0047305 A1   Feb. 15, 2018

(51) Int. Cl.
*G09B 23/32*   (2006.01)

(52) U.S. Cl.
CPC .................... *G09B 23/32* (2013.01)

(58) Field of Classification Search
USPC ............................................ 73/12.04, 12.07
See application file for complete search history.

(56) References Cited

U.S. PATENT DOCUMENTS

| | | | |
|---|---|---|---|
| 4,691,556 A | 9/1987 | Mellander et al. | |
| 7,743,640 B2* | 6/2010 | Lampe | A42B 3/068 73/12.04 |
| 9,140,637 B2* | 9/2015 | Kis, Jr. | G01N 3/30 |
| 9,395,265 B2* | 7/2016 | O'Shaughnessy | G01M 7/08 |
| 9,797,821 B2* | 10/2017 | Duma | G01N 3/30 |
| 10,094,737 B2* | 10/2018 | Aekbote | B60R 21/232 |
| 10,145,677 B2* | 12/2018 | Wu | G01B 11/16 |
| 2005/0081656 A1 | 4/2005 | Saari et al. | |
| 2005/0100873 A1 | 5/2005 | Metythaler et al. | |
| 2015/0369694 A1 | 12/2015 | Neale et al. | |
| 2016/0290881 A1* | 10/2016 | Sicking | G01M 7/08 |

OTHER PUBLICATIONS

Pansare, V. et al., "Review of Long-Wavelength Optical and NIR Imaging Materials: Contrast Agents, Fluorophores and Multifunctional Nano Carriers", Chem Mater, vol. 24, Issue 5, Mar. 13, 2012, pp. 812-827.*
Samaka, H. et al., "Finite Element (FE) Human Head Models/ Literature Review", International Journal of Scientific and Technology Research, vol. 2, Issue 7, Jul. 2013, pp. 17-31.*
Bayly, P.V. et al., "Deformation of the Human Brain Induced by Mild Acceleration", J Neurotrauma, vol. 22, Issue 8, Aug. 2005, pp. 845-856.*
Lingeman, J.E. et al., "The Role of Lithotripsy and Its Side Effects", J. Urol. Volume 141, (3 Pt. 2), Mar. 1989, pp. 793-797 (Abstract Only).*
Rowson S., Duma S.M.: Brain Injury Prediction: Assessing the combined probability of concussion using linear and rotational head acceleration. A Biomed Eng, 2013; 41(5): 873-882.
Ivancevic V.G.: New mechanics of traumatic brain injury. Cogn Neurodyn, 2009; 3: 281-293.

(Continued)

*Primary Examiner* — Daniel S Larkin

(57) ABSTRACT

The present invention provides an apparatus and methods to quantitatively measure a physical perturbation to a human head model by a mechanical impact of a blunt trauma. The apparatus is configured to obtain a set of non-contact measurement data from the human head model upon the mechanical impact. A source of the mechanical impact is configured to vary in kinetic energy by varying weight of the source and speed of the mechanical impact.

11 Claims, 16 Drawing Sheets

(56) References Cited

OTHER PUBLICATIONS

Meaney D.F., Morrison B., Bass. C.D.: The mechanics of traumatic brain injury; A review of what we know and what we need to know for reducing its social burden. J Biomech Eng, 2014; 136: 021008-1-021008-14.

Takhounts E. G., Ridella S.A., Hasija V., et al: Investigation of traumatic brain injuries using the next generation simulated injury monitor (SIMon) finite element head model. Stapp Car Carsh J, 2008; 08S-09: 1-31.

Von Holst H., Kleiven S.: The noninvasive brain injury evalutaion, NIBIE—A new image technology for studying the mechanical consequences of traumatic brain injury. INTECH, 2014; Chapter 6: 121-141.

Eierud C., Craddock R.C., Fletcher S., et al: Neuroimaging after mild traumatic brain injury—Review and meta-analysis. NeuroImage: Clinical, 2014; 4: 283-294.

Klein R.: Material properties of plastics. Laser welding of plastics, first ed. Wiley-VCH Verlag GmbH & Co. KGaA. 2011; pp. 32-69.

Goenka S., Peelukhana S.V., Kim J., et al: Dependence of vascular damage on higher frequency components in the rat-tail model. Industrial Health, 2013; 51: 373-385.

Nickoloff E.L.: AAPM/RSNA physics tutorial for residents: Physics of flat panel fluoroscopy systems. Imaging physics, 2011; 591-602.

Piao D., Xie H., Musgrove C., et al: Near-infrared optical tomography: endoscopic imaging approach. Proc. of SPIE, 2007; 6431: 643103-1-643103-10.

\* cited by examiner

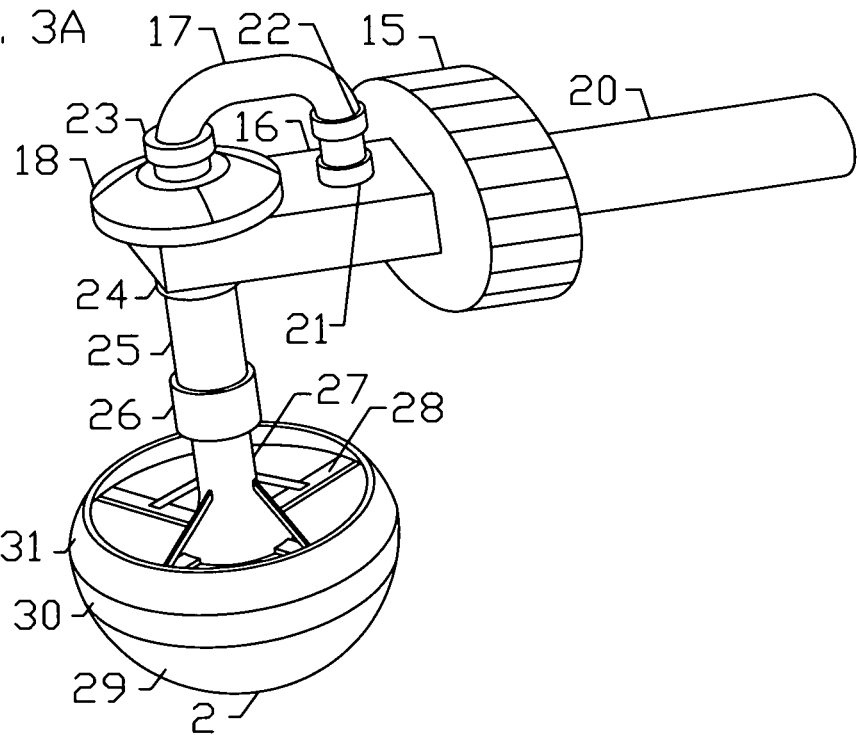
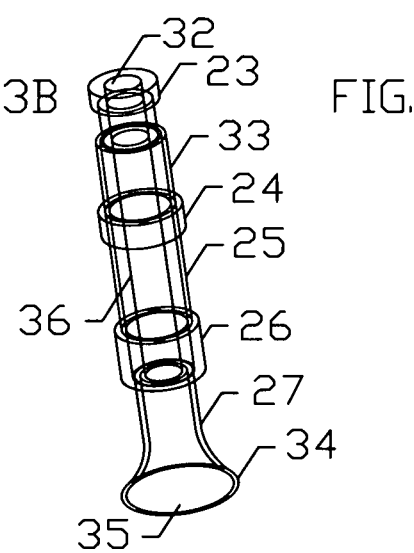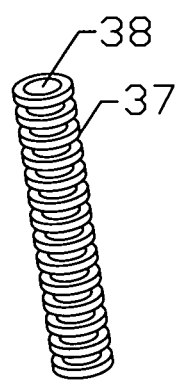

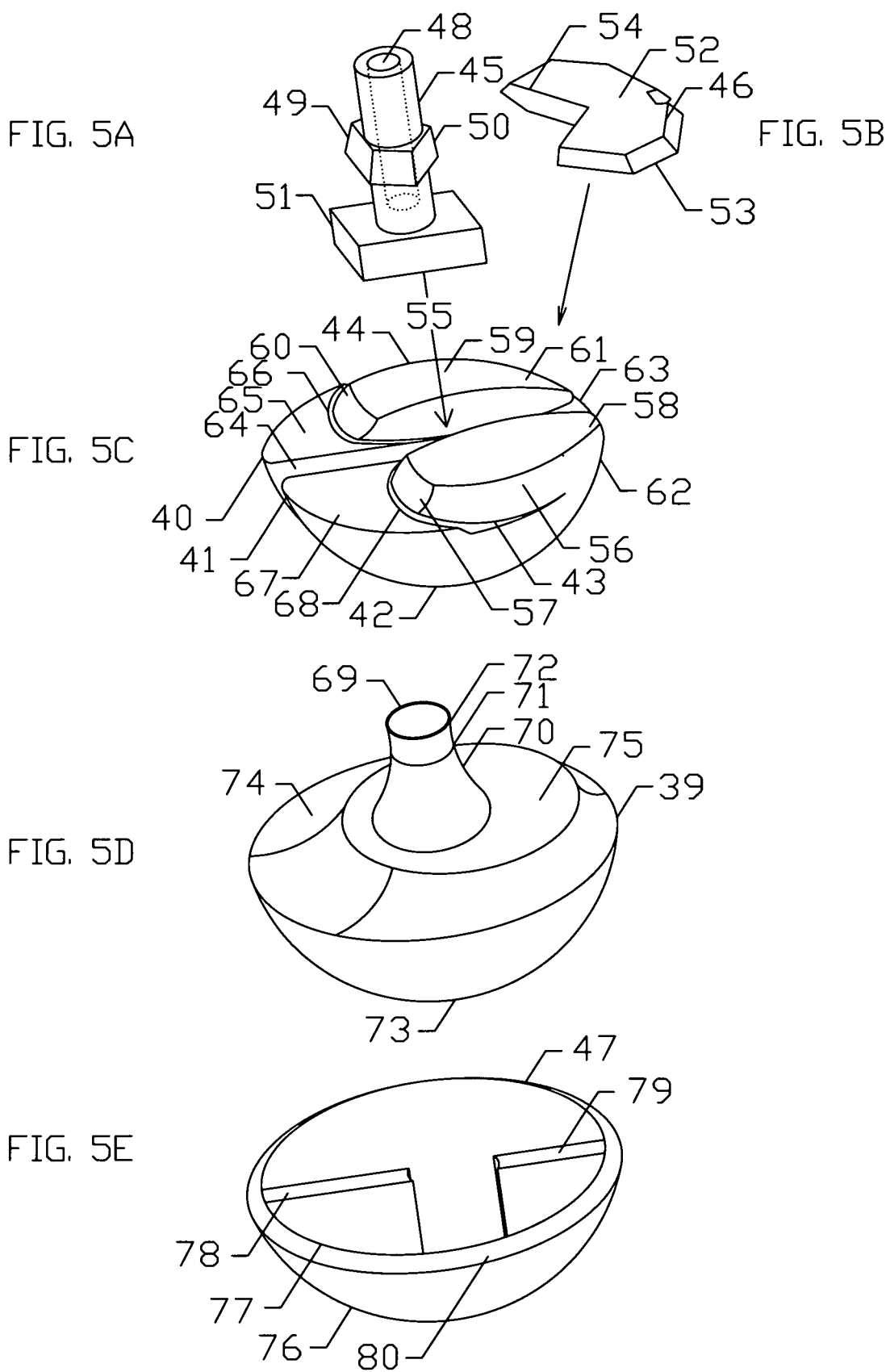

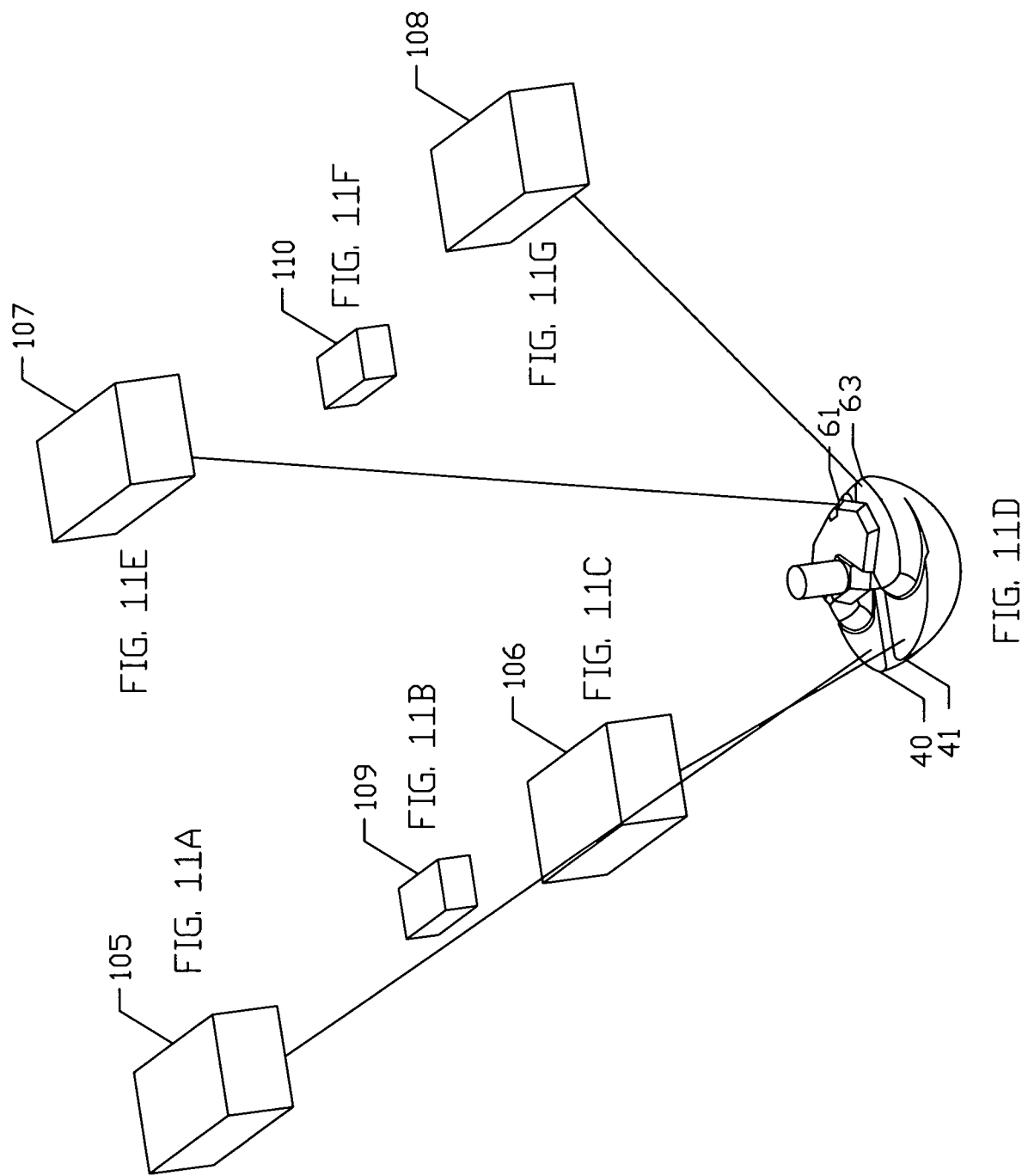

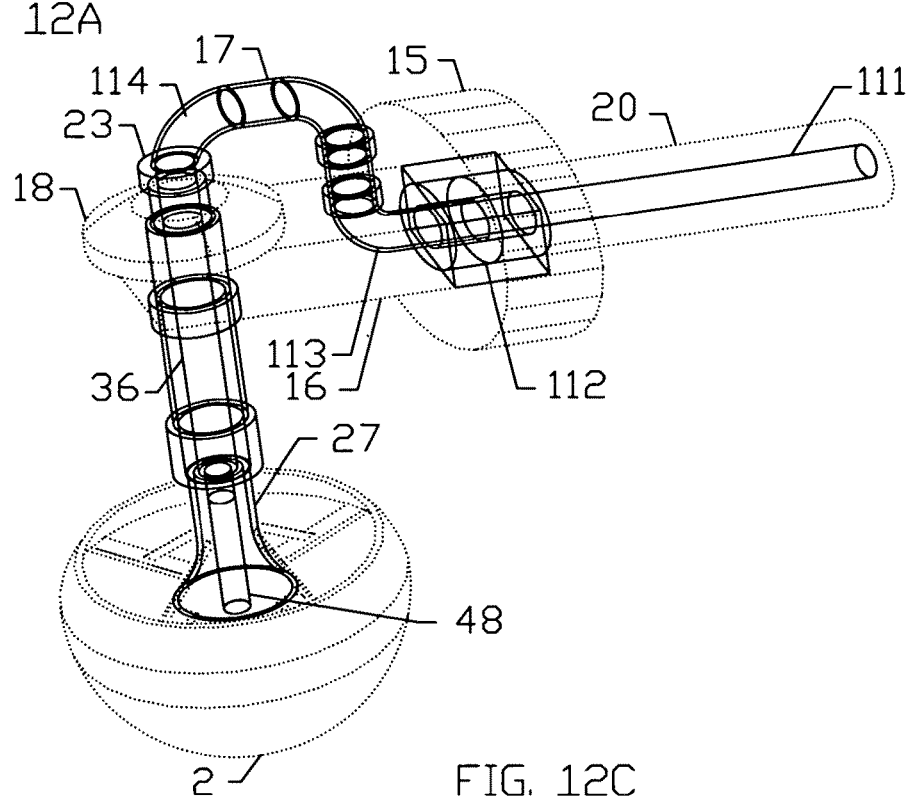
FIG. 12A
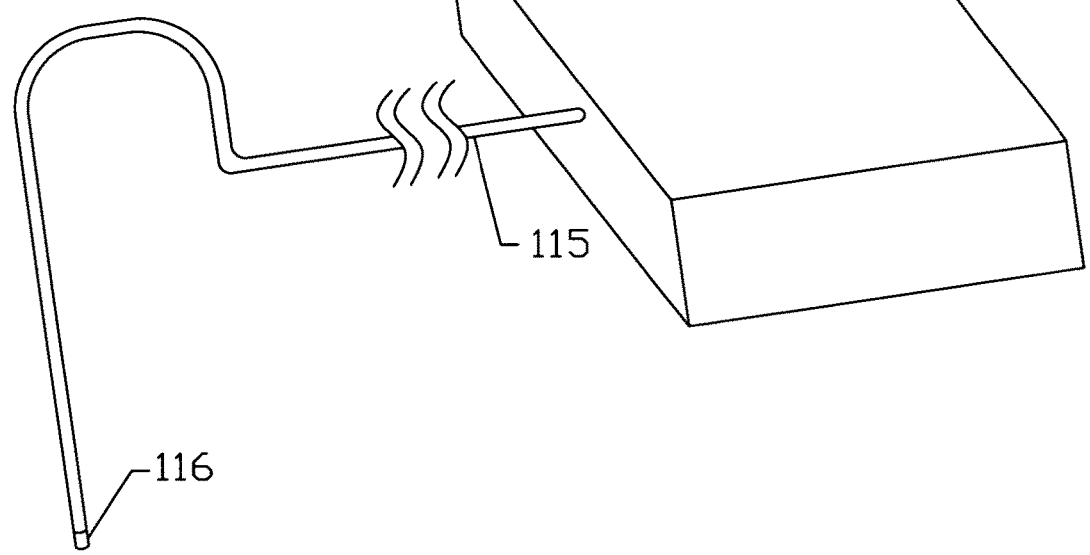
FIG. 12B
FIG. 12C

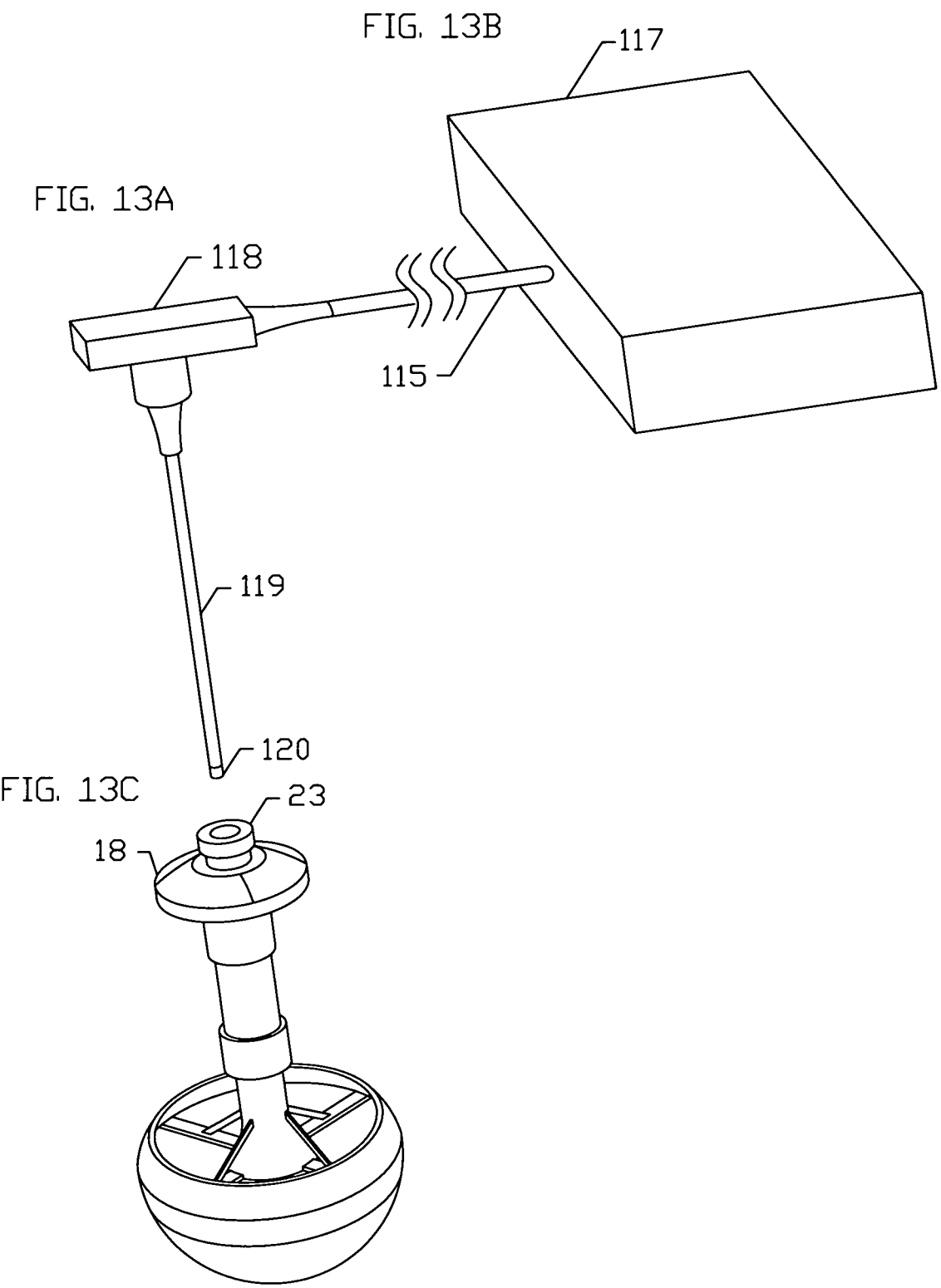

FIG. 16A
FIG. 16B
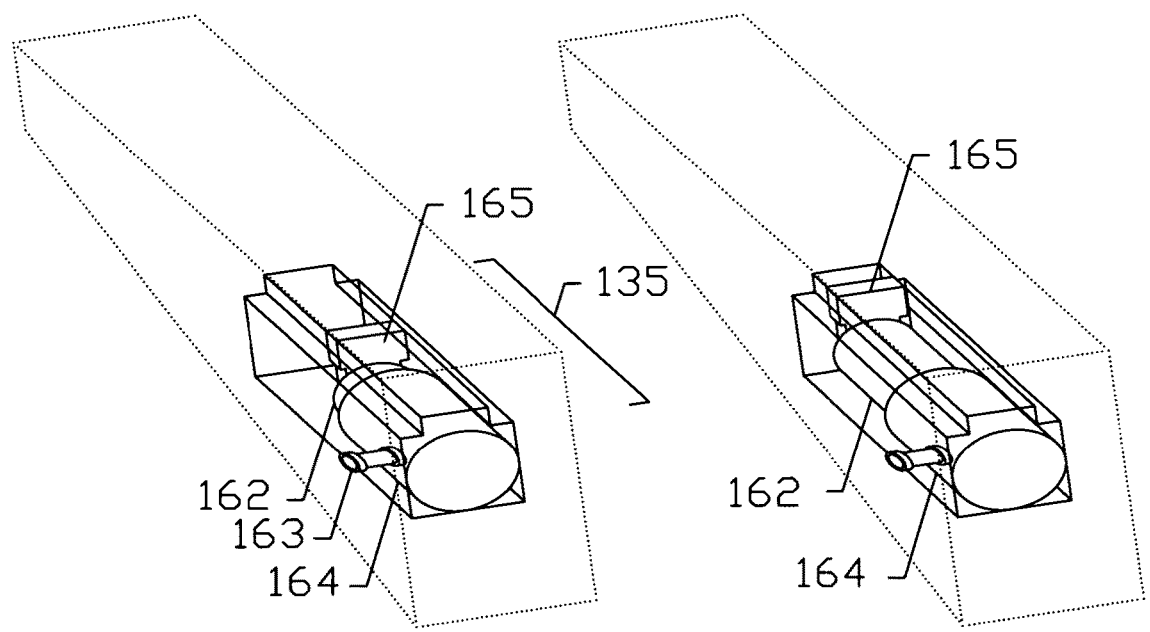
FIG. 16C
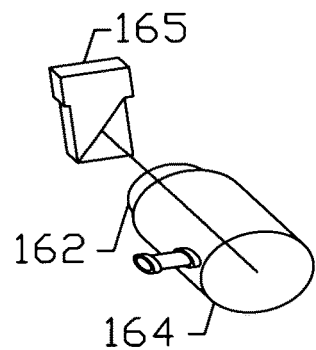

IMPACT-DRIVEN TRAUMATIC BRAIN INJURY TESTING APPARATUS

TECHNICAL FIELD

The present invention relates generally to the field of protecting the human head upon a trauma. More specifically, the present invention provides an apparatus and methods to reproducibly quantify the mechanical impact of a traumatic brain injury to the human head.

BACKGROUND OF THE INVENTION

Traumatic brain injury and pathophysiologic consequences of the traumatic brain injury have been theorized by several mechanisms such as 'positive pressure theory', 'rotational shear stress theory', 'angular acceleration theory', 'cerebrospinal fluid displacement theory' and 'negative pressure theory resulting in cavitation'. These theories, however, have failed to conclusively verify unifying mechanisms of the traumatic brain injury of the so-called contrecoup injury and other associated injuries. Researches have begun investigating cases of chronic traumatic encephalopathy sustained by combat soldiers and athletes for pathophysiologic changes in cellular and molecular levels using mouse or porcine models. Diffuse axonal injury and cerebral vasospasm without bleeding from cerebral blood vessels have been identified as one of pathophysiologic changes after the blunt head trauma. Integrin mediated activation of Rho kinase and phenotypic switches indicative of vascular remodeling have also been identified. In addition, computer simulations of the blunt head trauma using finite element models have advanced our understanding of mechanisms of the traumatic brain injury. Of note, all of these studies have been based on and postulated by level of macroscopic deformation of a brain tissue and changes in intracranial pressure upon the traumatic brain injury. Tissue injury such as axonal injury is presumed to occur once a certain tolerance limit of either the deformation or the intracranial pressure of the brain tissue is exceeded. For example, estimates of the shear strains in volunteers during physiological rotations of brain have been shown to reach near the thresholds for axonal damage at 0.05 mm/mm.

Tissue damage could also occur by repetitive vibrations of the tissue from mechanical waves without increases in pressure the tissue is under or measurable deformations of the tissue by an accelerating or decelerating mechanical force. One example of this phenomenon has been clinically used for breaking up kidney stones of patients by delivering shock waves which are mechanical waves. Complications of the shock wave therapy (Lithotripsy) include intraparenchymal and perirenal hemorrhage and edema as acute complications and loss of renal function and hypertension as chronic complications, indicating that the shock waves can damage soft tissues of the kidney which do not come under deformation of their structure nor increase in their tissue pressure upon an exposure to the shock waves. Separately, studies on vascular damage and disorder of bone formation by repetitive vibrations imply that the vibrations of the mechanical waves to tissue should also be considered a factor of the tissue damage. For the traumatic brain injury which is a result of a blunt trauma delivering the mechanical waves having a certain set of frequency and amplitude to a brain, there have not been well studied correlative data on the frequency and the amplitude of the mechanical waves with pathophysiologic findings for individual tissues of the brain upon the blunt trauma. It appears that common reasons for lack of the data come not only from our inability to obtain such data from the experimental brain models, but also from lack of such consideration for mathematical algorithms for computational simulations using the finite elements which are currently available. The mathematical algorithms for the computational simulations have relied on theoretical hypotheses of the tissue damage by development of the deformation of the tissue and increases in the intracranial pressure. There has not been a theoretical exercise to answer a hypothetical question on "Will there be a tissue damage upon the blunt trauma if there is no macroscopically measurable deformation nor an increase in intracranial pressure?". Deciphering quantitative correlation between the frequency and the amplitude of the mechanical waves and the pathophysiologic changes of the brain will surely positively advance our understanding of the traumatic brain injury and our designing protective headgears against the traumatic brain injury.

Instrumentation with pressure sensors and accelerometers directly attached to a portion of an experimental model of a brain may interfere with unmodified propagation of the mechanical waves through the brain model, since the pressure sensors and the accelerometers serve as a boundary having a different transfer function to the mechanical waves crisscrossing the brain model. The pressure sensors and the accelerometers comprise a printed circuit board and electronic components, which are heterogeneous and different in composition of materials from materials of the brain model. Even when these sensors could be placed on an outer surface of the brain model, there would be mechanical waves bouncing off the sensors in a different way from what is expected in the unmodified propagation of the mechanical waves through the brain model. For this reason, it would be better in understanding kinetic response of the brain model to use non-contact measurement methods of the mechanical waves and the deformation of the brain model upon the blunt trauma.

Laser doppler vibrometry allows non-contact measurement of frequency and amplitude of mechanical vibrations of an object in a wide range of frequency with a resolution of a subnanometer. A three-dimensional conformational modeling of a brain of the present invention comprises a skull base on which three structurally distinct components sit, including cerebrum, brain stem and cerebellum. An undersurface of a frontal lobe and an undersurface of occipital lobe of the cerebrum can be exposed if the brain is positioned upside down with a skull overlying the brain being vertically below the brain and the skull base eliminated. A single point laser doppler vibrometer such as Polytec OFV-55x with OFV-2570 (Polytec GmbH Waldbronn) can be configured to aim at a point of the undersurface of the frontal lobe, which can measure the frequency and the amplitude of the mechanical waves of a blunt trauma to the skull transmitted to the frontal lobe. Likewise, another laser doppler vibrometer aims at a point of the undersurface of the occipital lobe. Furthermore, a scanning laser vibrometer such as PSV-500-3D Scanning Vibrometer (Polytec GmbH Waldbronn) can obtain data of frequencies and amplitudes of an entire area of the undersurface of the both frontal and occipital lobes.

A major obstacle of our understanding of mechanical changes of the brain upon the traumatic brain injury is our inability to see inner components of the brain following the blunt trauma. Magnetic resonant imaging (MRI) studies have been utilized for visualization of the inner components but it has been limited by low resolution, slow image acquisition rate and requirement of an elaborate equipment.

Non-infrared (NIR) fluorescence with excitation >750 nm can be utilized for assessing displacement of inner components of a three-dimensional conformational brain model based on its high signal-to-noise ratio, minimal light absorption, maximal penetration, and low background due to minimal autofluorescence. A source of a primary NIR light is placed in the middle of the three-dimensional conformational brain model, which provides a high-intensity NIR light of >750 nm in a spherical distribution to cover the three-dimensional conformational brain model. The three-dimensional conformational brain model comprises NIR fluorophore beads orderly dispersed inside the brain model, which has a maximum absorption of NIR of >750 nm. A secondary NIR light is emitted from the NIR fluorophore beads upon excitation by the primary NIR light through the three-dimensional conformational brain model to the exposed surface of a base portion of the three-dimensional conformational brain model, which is configured to be detected by an NIR imaging camera installed away from the three-dimensional conformational brain model for non-contact imaging of the three-dimensional conformational brain model. The NIR camera would be high-speed and high-resolution, like High definition Mini SWIR™ (Sensors Unlimited, UTC Aerospace Systems) which has a 640×512 pixel InGaAs camera capable of 109 full frames per second with frame rates over 15,220 full frames per second depending on the selected pixel area.

The three-dimensional conformational brain model is configured to imitate gyral convolutions and sulci noted on a surface of a human brain. An apical portion of the gyri along a longitudinal line and a valley portion of the sulci along a longitudinal line are imprinted with a linear radiopaque thermoplastic or a thin metal strip, which can be visualized by a digital X-ray fluoroscope using a high-speed and high-resolution complimentary metal-oxide semiconductor (CMOS) detector such as Dexela 2307 flat panel X-ray detector (PerkinElmer Inc.) featuring a 3072×864 pixel matrix and up to 191 frame per second visualization. The fluoroscopic image captures movements of radiopaque lines on the gyri and in the sulci reflecting movements of a spherical surface of the three-dimensional conformational brain model, whereas the NIR image discloses internal displacement of the three-dimensional conformational brain model. These two imaging modalities are coordinated in real time with the laser doppler vibrometer for recording structural changes, and a frequency and an amplitude of the vibration of the three-dimensional conformational brain model upon the blunt trauma.

One key consideration for modeling a model brain for experimentation for the traumatic brain injury is a composition of materials which should mimic the composition of natural brain. Whole brain comprises water of 75~80%, fat of 10%, cerebroside of 2% and protein of 8%. Gray matter of the brain comprises water of 83%, fat of 5%, cerebroside of 1% and protein of 7.5%. White matter of the brain comprises water of 70%, fat of 10.5%, cerebroside of 4.5% and protein of 8.5%. Cerebrospinal fluid has up to about 40 mg/dL of protein and a negligible amount of sugar. Differences in the composition between the gray and white matters are most significant for their water concentration, which has an implication of differences on the transfer function for transmission of mechanical waves through each matter and of the boundary effect of the mechanical waves. Furthermore, the gray matter comprises mostly neuronal cells having a round cellular body whereas the white matter has striated, relatively linear axons spreading out from the neuronal cells, which would affect propagation of the mechanical waves differently through each matter. Apart from the finite element models for computer simulations, existing models using polymers such as gelatin, Sylgard elastomer, polydimethylsiloxane-based (PDMS) gels, or agarose gel do nor reflect these differences nor do they contain a water concentration up to 80% except for the gelatin and the agarose gel.

A suitable material for the model brain for experimentation for the traumatic brain injury would require a significant amount of water up to 85% embedded in a polymeric cross-linking structure, to share elastomeric properties similar to that of the brain and to be chemically inert. Limitations for the gelatin and the agarose gel are that they are denatured biological materials which get decomposed over time, resulting in a decay of their original elasticity and a potential problem of inconsistency in test results due to their change in conformation over time, and a limited shelf life. One major advantage of the gelatin and agarose gel is that they are heterogeneous in size with varying molecular weight, mimicking the natural brain comprising diverse components with a wide range of molecular weights. In contrast, synthetic hydrophilic polymers such as polyacrylamide, or poly(2-hydroxyethyl methacrylate) are relatively homogeneous, have a more refined range of molecular weight, are stable over an extended period of time, and yield consistently reproducible test results. Both organic gels and synthetic hydrophilic polymers can be used for the model brain for the present invention, tailored for their advantages and limitations.

For visualization of internal deformation of the model brain upon the traumatic brain injury, the hydrophilic polymer of the model brain in a three-dimensional configuration can be marked with orderly arranged NIR dye beads which emit light in an NIR spectrum upon an incident NIR light. For an example, NIR dye beads are made of a poly(N-vinyl imadazole) polymer which is both water soluble and methanol soluble. A range of solvent soluble NIR dyes such as ADS775MI (2-[2-[2-Chloro-3-[(1,3-dihydro-1,3,3-trimethyl-2H-indol-2-ylidene)ethylidene]-1-cycloxen-1-yl]-ethenyl]-1,3,3-trimethyl-1H indolium iodide) (American Dye Source, Inc) can be incorporated into the poly(N-vinyl imadazole) NIR beads in a methanol solvent. As the poly(N-vinyl imadazole) NIR beads are water soluble, they can be statically incorporated into the hydrophilic polymer of the model brain containing water molecules. The ADS775MI associated with the poly(N-vinyl imadazole) NIR beads remains only in the poly(N-vinyl imadazole) NIR beads, and does not leak out to a surrounding hydrophilic polymer of the model brain, since it is methanol soluble but not water soluble. A source of NIR light is placed close to a middle of the three dimensional conformation of the model brain and is configured to generate an intensity of NIR light enough to penetrate entire hydrophilic polymeric layers of the model brain in a way an emitted NIR light from the poly(N-vinyl imadazole) NIR beads reaches to a surface of the model brain with a sufficient intensity to be detected by an NIR camera placed away from the model brain in a distance. The emitted NIR light from the NIR beads will be seen by the NIR camera in a pattern similar to a shaded topographic map of a region by a geostationary satellite scanning the region. If there would be a temporary internal deformation or structural changes of the hydrophilic polymer of the model brain upon the blunt trauma, there will be fluctuating areas of a higher density of the emitted NIR light and of a lower density of the emitted NIR light which can be captured in real time following reception of the blunt trauma by the NIR camera configured to visualize the changes in the distribution of the orderly dispersed NIR beads into aggregated clusters of the NIR beads in the three-dimensional conformational model brain.

The three-dimensional conformational model brain can be divided into nine distinctive geometric groups which would respond to the mechanical waves of the blunt trauma differently from each other. These include an opposing pair of one-half cerebral hemispheres, a pair of free ended temporal lobes having an elongated trapezoidal configuration located below the one-half cerebral hemispheres, a pair of occipital lobes which adjoin a distal part of each temporal lobe and are located distal to the one-half cerebral hemispheres, a corpus callosum in a box configuration adjoining a medial surface of each one-half cerebral hemisphere and a brain stem in a cylindrical configuration adjoining the corpus callosum. In addition, a cerebellum in a configuration of a ellipsoidal disk can be reversibly combined with a distal part of a portion of the brain stem. Although these parts are interconnected with each other, they are configured to be freely movable on their own simulating a natural state of a natural brain. It is important to recognize that the brain comprises a group of freely movable parts independent of each other, albeit in a tight space, which is not reflected by all available finite element models for computer simulations. Furthermore, in a natural brain, the cerebellum is separated from the cerebrum and its associated structures by a tout tentorial membrane which segregates the cerebrum into a supratentorial region and the cerebellum into a infratentorial region of the brain. Importance of the tentorial membrane cannot be ignored as herniation of the cerebrum and its associated structure through a hole of the tentorial membrane from the supratentorial region to the infratentorial region results in death for almost all individuals. Mechanistically, presence or absence of the cerebellum in the model brain would alter kinetic response of the model brain upon the blunt trauma. Therefore, two separate models of the model brain would be necessary for studying the traumatic brain injury, with one with the cerebellum and the other without the cerebellum. The model brain with the cerebellum is designed to study a kinetic response of an entire brain structure of the model brain, whereas the model brain without the cerebellum focuses on a kinetic response of the supratentorial region of the model brain.

Cerebrospinal fluid (CSF) serves as a liquid medium which facilitates transfer of various components in the brain and contributes to homeostasis of the brain. In the traumatic brain injury, role of the CSF is yet undefined. Although there are speculative descriptions on a protective role of the CSF for the brain, none of these are based on solid investigative findings except for its role for neutral buoyancy for the brain to maintain a suspended configuration inside the meningeal membrane. All internal organs such as heart, lungs and bowel are immersed in a tiny amount of a biologic fluid which serves for important roles for the transfer of biologic materials between the organs, surveillance of foreign antigens, and maintenance of homeostasis of the organs. It stands to reason that the CSF is no exception to this and there would not be a mechanical role of the CSF for protecting the brain in case of the blunt trauma. In the kinetic response to the blunt trauma, the CSF may rather serve as a simple fluid medium having a higher transfer function for the mechanical waves of the blunt trauma to the brain facilitating transfer of the frequency and the amplitude of the mechanical waves to the brain proper. To investigate the role of the CSF for the traumatic brain injury, the three-dimensional conformational model brain comprises two separate configurations for a CSF sac. One model has a fully encapsulated configuration of the model brain for its entirety including all nine geometric groups except for a distal part of the brain stem. A second model has an open configuration which lacks a basal membrane of the CSF sac covering the base portion of the model brain. A bowl shaped hemispherical portion of the CSF sac covers a top portion of the cerebral hemisphere, while a bottom portion of the model brain is exposed. The exposed bottom portion of the model brain can be assessed by the laser doppler vibrometer for studying vibration of the model brain per se. The first model with full encapsulation of the model brain can also be studied for the vibration by the laser doppler vibrometer. In the first model, the membrane portion of the CSF sac covering the bottom portion of the model brain will be assessed for the vibration.

Intensity of an amplitude of the mechanical waves delivered to the brain tissue depends on a mass (weight) of a source generating the mechanical waves multiplied by a velocity of an impact from the source and a mass (weight) of a victim and a stopping distance of the impact by the victim colliding with the source: $KE=\frac{1}{2} \times mv^2$ where $KE$ is kinetic energy before an impact, m is mass in kg and v is velocity in meter/second. Since the stopping distance of the impact by the victim is a relatively fixed value, the weight of both the source and victim for the most part would determine the amplitude of the mechanical waves from the impact. This can be studied by having a colliding dummy which varies in weight and impact velocity, while the model brain is harnessed by a positioning device in a standstill. The colliding dummy is driven to collide the model brain at an angle, simulating common situations of the blunt trauma. Since the blunt trauma is a bidirectional event involving both the colliding dummy and the model brain, data on gravitational force, impact pressure, translational displacement and rotational displacement of the impact between the colliding dummy and the model brain can be obtained by a pressure sensor and a triaxial accelerometer placed within a head portion of the colliding dummy.

SUMMARY OF THE INVENTION

To measure vibration of a model brain upon an impact by mechanical waves of a blunt trauma and correlate the vibration with a deformation of the impacted model brain by non-contact measurement devices, the present invention comprises a colliding dummy and the model brain enclosed in a model head fixated to a suspension assembly of an immobile station. The model brain is configured to be assessed in a non-contact fashion by a plurality of laser doppler vibrometers for measuring the vibration, and by a plurality of high-resolution and high-speed near-infrared (NIR) light cameras and a high-resolution and high-speed digital X-ray fluoroscope for measuring the deformation. The colliding dummy comprises a head which is equipped with a plurality of pressure sensors and a plurality of triaxial accelerometers. The pressure sensors and the triaxial accelerometers are configured to measure a gravitational force, a impact pressure, a translational displacement and a rotational displacement of the colliding dummy upon impacting the model brain. Data of the vibration and the deformation of the model brain are to be correlate with the gravitational force, the impact pressure, the translational displacement and the rotational displacement of the colliding dummy impacting the model brain. The colliding dummy is configured to vary in weight and speed of a collision with the model brain.

In one embodiment, the model brain is a part of a model head which comprises a polymeric layer equivalent to a scalp layer of a natural human head, a polymeric layer equivalent to a skull, an inner polymeric layer equivalent to a meningeal membrane encasing a cerebrospinal fluid (CSF) sac made of a polymeric film pouch, a fluid filled in the CSF sac and the model brain. An example of the polymeric layer equivalent to the scalp layer is a thin layer made of an organosilicon polymer such as poly(dimethylsiloxane) tightly encasing the skull equivalent polymeric layer. An example of the skull equivalent polymeric layer comprises a thermoplastic resin such as poly(methyl methacrylate) mixed with methylmethacrylate having a lower modulus and a lower deformation resistance, which is about 5~10 mm in thickness and hemispherically shaped mimicking a natural human skull. An example of the meningeal membrane equivalent polymeric layer is a polyethylene terephthalate membrane such as polyester which tightly adheres to an inner surface of the skull equivalent polymeric layer and to an outer surface of the CSF sac. An example of the CSF sac equivalent polymeric film pouch comprises a thin composite layer of polyurethane and polyethylene which imparts a degree of flexibility and stretchability to the CSF sac. The fluid in the CSF sac comprises a hydrophilic polymer such as carboxymethyl cellulose, for an example, dissolved in a sterile fluid, which is configured to mimic a viscous feature of a natural CSF due to presence of protein in the CSF. The model brain comprises a hydrophilic polymer such as gelatin, agarose gel, polyacrylamide, or poly(2-hydroxyethyl methacrylate), which is gelled with up to 85% of sterile water to mimic an elastomeric feature of a natural brain.

In one embodiment, the hydrophilic polymer of the model brain is marked with orderly arranged NIR dye beads which emit light in an NIR spectrum upon an incident NIR light. For an example, NIR dye beads are provided in a granular configuration made of a poly(N-vinyl imadazole) polymer which is both water soluble and methanol soluble. A solvent soluble NIR dyes such as ADS775MI (2-[2-[2-Chloro-3-[(1,3-dihydro-1,3,3-trimethyl-2H-indol-2-ylidene)ethylidene]-1-cycloxen-1-yl]-ethenyl]-1,3,3-trimethyl-1H indolium iodide) (American Dye Source, Inc) is incorporated into the poly(N-vinyl imadazole) NIR beads in a methanol solvent. As the poly(N-vinyl imadazole) NIR beads are water soluble, the poly(N-vinyl imadazole) NIR beads are mixed with a water-containing hydrophilic polymer of the model brain in a liquid phase. They are fixated inside the water-containing hydrophilic polymer of the model brain once the water-containing hydrophilic polymer is transitioned to a solid phase. The ADS775MI associated with the poly(N-vinyl imadazole) NIR beads remains only in the poly(N-vinyl imadazole) NIR beads, and does not leak out to the hydrophilic polymer of the model brain surrounding the poly(N-vinyl imadazole) NIR beads, since it is methanol soluble but not water soluble.

In one embodiment, the NIR beads are geometrically placed inside the three dimensional conformation of the hydrophilic polymer of the model brain. One example is to place a silicone mold for the model brain in a center of a die cast configured in a hemispherical bowl, in which a top of the silicone mold is placed pointing downward and an open base of the silicone mold pointing upward. The die cast is equipped with a plurality of thin injector needles arranged circumferentially along an inner wall of the die cast. It starts from the hydrophilic polymer in the liquid phase being poured into the silicone mold. The plurality of injector needles are then inserted toward a central region of the silicone mold containing the hydrophilic polymer in the liquid phase after piercing through a wall of the silicone mold. A slurry of non-hydrated NIR beads dispersed in water will be injected through the injector needles into the hydrophilic polymer starting from the central region. While the slurry of the non-hydrated NIR beads is being injected, the injector needles are synchronizably withdrawn from the central region to a peripheral region of the silicone mold so as to produce a radial distribution of the non-hydrated NIR beads in the hydrophilic polymer. Following the injection of the non-hydrated NIR beads into the hydrophilic polymer, the hydrophilic polymer in the liquid phase provides the NIR beads with water by diffusion, and the hydrophilic polymer is let hardened together with the NIR beads, which maintains a static distribution of hardened NIR beads in the hydrophilic polymer in the solid phase. The statically placed NIR beads are configured to provide visual data in an NIR spectrum on a dynamic internal displacement of the model brain upon the impact of the blunt trauma.

In one embodiment, the model head encasing the model brain is configured to be suspended in air by the suspension assembly upside down with a vertex portion of the model head pointing downward and a base portion of the model head pointing upward in an open configuration exposing a base portion of the model brain. The suspension assembly is connected to the immobile station which is configured to withstand a range of the gravitational force of the impact from the colliding dummy without displacement from an original location of placement, to absorb mechanical waves transmitted from the suspension assembly holding the model head, and to provide the model head and the suspension assembly with electricity and an NIR light source. The model head held by the suspension assembly is configured to be placed within an imaging field of the X-ray fluoroscope, of the NIR cameras and of a conventional high-resolution and high-speed digital video-camera, and to have the base portion of the model brain be accessible to laser beams from the laser doppler vibrometers. In addition, the model head is placed in a configuration which allows the colliding head of the colliding dummy to hit the model head in a linear direction without hindrance.

In one embodiment, the suspension assembly comprises an attachment portion having a circumferential rim and a central cylindrical tube. The circumferential rim is configured to be rotatably and removably attached to a corresponding circumferential rim of the base portion of the model head. The circumferential rim of the suspension assembly is configured to be immovably connected to the central cylindrical tube which in turn is connected to an arm extending from the immobile station. An example of a configuration of connection of the central cylindrical tube to the circumferential rim includes a plurality of symmetrically placed radial bottom chords, with each chord attached to a portion of an inner surface of the circumferential rim on one end and to a portion of an outer surface of the central cylindrical tube on the other end. A top chord is attached at an angle to an upper surface of the bottom chord on one end and to a portion of the outer surface of the central cylindrical tube placed in a vertical distance above an attachment site of the bottom chord to the outer surface on the other end, which is configure to provide the connection of the central cylindrical tube with the circumferential rim with structural strength similar to a roof truss structure. The central cylindrical tube and the circumferential rim of the suspension assembly are made of impact resistant polymers such as high density polyethylene and polycarbonate. The suspension assembly is configured to releasably anchor a protective headgear which slidably encases the model head, for testing a capacity of the protective headgear to reduce the vibration and the displacement of the model brain upon the impact of the blunt trauma.

In one embodiment, the central cylindrical tube is configured to be circumferentially rotatable by a radial knob connected to an end portion of the central cylindrical tube which is attached to the arm of the immobile station. The radial knob is configured to rotate the circumferential rim connected to the central cylindrical tube in a way rotation of the central cylindrical tube horizontally changes an area of the model head to be collided by the colliding head of the colliding dummy. The central cylindrical tube is configured to serve as a conduit for a fiberoptic cable for an NIR light or an NIR scope for lighting the model brain. The central cylindrical tube is configured to isolate vibration of the mechanical waves of the impact to the model head by placing a plurality of vertically stackable doughnut-shaped silicone gel plates inside the central cylindrical tube. At an attachment junction between the central cylindrical tube and the arm of the immobile station, a vibration absorbing flange having an internal silicone gel is installed to tighten the junction and to further isolate the vibration of the mechanical waves.

In one embodiment, the arm extending from the immobile station comprises a proximal part and a distal part. The proximal part of the arm is connected to the central cylindrical tube of the suspension assembly, and the distal part of the arm is connected to the immobile station. The proximal part is coaxially connected to the distal part along a longitudinal axis of the arm via a rotatable radial wheel. An axis of the rotatable radial wheel is aligned with the longitudinal axis of the arm. The rotatable radial wheel is configured to rotate the proximal arm to which the central cylindrical tube of the suspension assembly is connected, which vertically changes an axis of the model head to the impact of the blunt trauma. At a junction between the proximal part of the arm and the rotatable radial wheel, a plurality of stackable doughnut-shaped silicone gels is placed to isolate the vibration of the mechanical waves.

In one embodiment, the fiberoptic cable for the NIR light is connected to an NIR light source housed in the immobile station. The NIR light source comprises a light source such as a quartz halogen light bulb or a light emitting diode, and is configured to emit an NIR light in a range of wavelength of 700 nm to 2500 nm. The fiberoptic cable is inserted through a conduit placed inside the arm of the immobile station and the central cylindrical tube of the suspension assembly to reach a cylindrical tubular space inside a brain stem of the model brain. A tip of the fiberoptic cable is configured to be placed close to a proximal end of the cylindrical tubular space of the brain stem near a junction between the brain stem and the corpus callosum. The NIR light source is configured to generate an intensity of the NIR light from the tip of the fiberoptic cable enough to penetrate an entire structure of the hydrophilic polymer of the model brain in a way an emitted NIR light from the NIR beads reaches to a surface of the model brain with a sufficient intensity to be detected by the NIR cameras placed away from the model brain in a distance.

In one embodiment, a rigid linear NIR endoscope is inserted vertically through the radial knob in the central cylindrical tube of the model brain close to the proximal end of the cylindrical tubular space of the brain stem near the junction between the brain stem and the corpus callosum. The rigid linear NIR endoscope is configured to be independently fastened by the end portion of the central cylindrical tube of the suspension assembly and to be connected to a main endoscopic instrument. At an fastening part of the end portion of the central cylindrical tube, there is provided a vibration absorbing flange having an internal silicone gel to tighten the junction and to isolate the vibration of the mechanical waves. The main endoscopic instrument is configured to generate and transmit an NIR light to a tip of the rigid linear NIR endoscope via a fiberoptic cable inside the rigid linear NIR endoscope and to receive an emitted NIR light from the NIR beads by a digital imaging sensor such as charge-coupled device (CCD) or CMOS. Since the emitted NIR light from the NIR beads encircles in 360° the tip of the rigid linear NIR endoscope, the tip of the rigid linear NIR endoscope is configured to be wide-angled to broaden an area of reception of the emitted NIR light. Major advantages of use of the rigid linear NIR endoscope are an increase in sensitivity of picking up the emitted NIR light and close-up visualization of the internal displacement of the model brain.

In one embodiment, the model brain is provided in nine distinctive geometric groups which include an opposing pair of one-half cerebral hemispheres, a pair of free ended temporal lobes having an elongated trapezoidal configuration along a longitudinal axis located above the one-half cerebral hemispheres, a pair of occipital lobes which adjoin a distal part of each temporal lobe and are located distal to the one-half cerebral hemispheres, the corpus callosum in a box configuration adjoining a medial surface of each one-half cerebral hemisphere, the brain stem in a cylindrical configuration adjoining the corpus callosum at a right angle and a cerebellum in a configuration of a ellipsoidal disk. These groups are interconnected with each other, but they are configured to be freely movable on their own simulating a natural state of a natural brain. The temporal lobe is separated on its lateral border from a lateral border of the one-half cerebral hemisphere but adjoins a medial border of the one-half cerebral hemisphere. The brain stem is configured with two adjoined parts, with one part of a cylindrical stem portion and the other part having a trapezoidal box portion extending from the cylindrical stem portion of the brain stem toward the corpus callosum representing pons of the natural brain. The trapezoidal box portion is close to the corpus callosum and the cylindrical portion is away from the corpus callosum. Two separate configurations of the model brain are provided, with one configuration having the cerebellum attached to a distal portion of the pons and the other configuration without the cerebellum. The model brain with the cerebellum is configured to study a kinetic response of the model brain with the cerebellum, whereas the model brain without the cerebellum focuses on a kinetic response of a supratentorial region of the model brain.

In one embodiment, a plurality of raised linear convolutions provided in a semi-cylindrical configuration are made on an outer surface of the one-half cerebral hemispheres, the temporal lobes, the occipital lobes and the cerebellum. The linear convolution is configured with an apical line in a middle portion of a semi-cylinder of said linear convolution, running along a longitudinal line of said linear convolution. One linear convolution is configured to form a valley with the other adjacent linear convolution along a longitudinal lateral edge of said linear convolution on a side of said linear convolution. There are two valleys and one apical line per one linear convolution, wherein the valley represents a sulcus and the linear convolution represents a gyrus of the natural brain. The apical line and the valley of the linear convolution of the model brain are imprinted with a linear radiopaque thermoplastic polymer containing a radiopaque agent such as barium sulfate, bismuth or tungsten, which is configured to be visualized by the digital high-resolution and high-speed X-ray fluoroscope. Radiopaque lines on the apical line and the valley of the linear convolution of the model brain are configured to provide visual data under X-ray fluoroscopic visualization of a dynamic surface displacement of the model brain upon the impact of the blunt trauma.

In one embodiment, the CSF sac is configured to be a sealed, hemispherically dome-shaped bowl covered by a flat base in which the CSF is contained. The CSF comprises sterile water and carboxymethyl cellulose in a concentration to achieve a viscosity of the CSF in a range of 0.7~1.0 mPa-s, similar to the viscosity of a natural CSF. The CSF sac is provided in two distinctive configurations. A first configuration of the CSF sac encapsulates the entire structure of the model brain including all nine geometric groups except for a distal cylindrical portion of the brain stem which is configured to be inserted in the central cylindrical tube of the suspension assembly. A second configuration of the CSF sac is hemispherically dome-shaped with the flat base of the CSF sac open so as to expose the base portion of the model brain to atmosphere. The first configuration of the CSF sac allows the laser doppler vibrometers to measure the vibration of the CSF sac covering the base portion of the model brain. The second configuration of the CSF sac allows the laser doppler vibrometers to measure the vibration of a base portion of each one-half cerebral hemisphere, a base portion of each temporal lobe, a base portion of the occipital lobe and a base portion of the cerebellum. In addition, both configurations allow a scanning laser doppler vibrometer to assess global vibration of the model brain upon the impact.

In one embodiment, the immobile station comprises a main tower connected to the arm, a vibration isolating base supporting the main tower and a heavy weight base contacting the ground. The main tower is configured to immobilize the arm, and to house instruments such as the NIR light source. A material for the main tower is configured to be less prone to reciprocating the vibration transmitted from the arm, which includes a solid timber for an example. The solid timber is more heterogeneous in molecular composition and microscopic structure than a structure made of metals or a structure made of polymers. At a junction between the distal part of the arm and the main tower, a plurality of vibration isolating plates of silicone are inserted to reduce transmission of the vibration from the arm to the main tower. In addition, the main tower is vertically placed on the vibration isolation base which is horizontally placed at a right angle to the main tower. The vibration isolation base comprises an upper layer and an lower layer made of a solid timber and a plurality of vibration isolating layers in between the upper and lower layers made of polymers such as neoprene, sorbothane, silicone or natural latex. Underneath the vibration isolation base, the heavy weight base is fixedly attached to the vibration isolation base. The heavy weight base is configured to immobilize an entire structure of the immobile station. An example of a material for the heavy weight base is sand which is contained in a wooden box.

In one embodiment, the colliding dummy is a part of a collision assembly which comprises the colliding dummy driven by a collision propulsion assembly fixated to the ground. The collision assembly is positioned in close proximity to the immobile station and the X-ray fluoroscope in a way a longitudinal axis of the collision assembly is in parallel with a longitudinal axis of the immobile station and of the X-ray fluoroscope. The collision propulsion assembly comprises a linear slot assembly through which the colliding dummy is configured to slide, and a gas-pressure driving assembly located distal to the linear slot assembly. An upper wall of the collision propulsion assembly is sloped downward from a distal end wall to a proximal end wall, which is configured to slide forward the colliding dummy from the distal end wall toward the proximal end wall. In a mid portion of the upper wall of the collision propulsion assembly along the longitudinal axis, an open linear slot is provided, in which a corresponding rail portion of the colliding dummy is configured to slide. The gas-pressure driving assembly comprises a compressed gas chamber with a piston which is enclosed in a rear section of the collision propulsion assembly and is connected to a hose providing the compressed gas chamber with compressed gas from a gas compressor. The compressed gas chamber is a passive chamber storing the compressed gas and has a controllable conduit through which the compressed gas is at once released to push forward the piston. The gas compressor is configured to pump the compressed gas into the compressed gas chamber ahead of a testing time, which is to avoid transmission of vibration from the gas compressor to the collision assembly and adjacent devices of the present invention at the time of the testing. The piston of the collision propulsion assembly is configured to push forward a lower portion of the colliding dummy enclosed in the linear slot assembly.

In one embodiment, the colliding dummy comprises a dummy head attached to a trunk portion via a neck portion, a rail assembly attached to the trunk portion and a stabilizer adjoining a lower part of the rail assembly. The colliding dummy is positioned at an angle to the upper wall of the collision propulsion assembly toward the model head suspended by the suspension assembly in a way the dummy head is configured to collide with the model head in a linear direction without hindrance. The dummy head is is equipped with a plurality of pressure sensors and a plurality of triaxial accelerometers so as to measure the gravitational force, the impact pressure, the translational displacement and the rotational displacement of the colliding dummy upon impacting the model brain. The stabilizer of the colliding dummy is configured to be pushable by the piston of the collision propulsion assembly, which in turn slidably carries the rail assembly of the colliding dummy in the linear slot assembly of the collision propulsion assembly. The trunk portion and the stabilizer are configured to vary in weight to reflect actual scenarios of collision between individuals of different weights. Speed of a forward sliding movement of the colliding dummy is configured to be adjustable by a range of forward force of the piston against the stabilizer of the colliding dummy, which is adjusted by a speed and an amount of release of the compressed gas from the compressed gas chamber.

In one embodiment, a set of digitized and calculable data of an external deformation, an internal deformation and a vibration of the model head from a collision between the colliding dummy and the model head suspended by the suspension assembly are simultaneously obtained together with a set of calculable data of the impact pressure, the gravitational pressure, the translational displacement, and the rotational displacement of the head of the colliding dummy starting from a pre-collision point of time to a complete rest of the model head without the external deformation, the internal deformation or the vibration. A time series analysis and a multiple regression analysis as a minimum set of analysis will be performed on the set of digitized and calculable data of the vibration of the base portion of the model brain, of the secondary NIR light emitted from a plurality of the NIR beads in the model brain, of fluoroscopic visualization of a plurality of the radiopaque lines disposed on the surface of the model brain, of the visual event of the impact of the colliding dummy to the model head and from a plurality of the pressure sensors and a plurality of the triaxial accelerometers of the colliding dummy. A main objective of the analyses is to establish an impact-response curve between a force of the impact and a degree of a measurable physical perturbation as a surrogate for a tissue damage of the natural brain. The physical perturbation is a composite, calculable formula derived from the aforementioned set of digitized and calculable data. The impact-response curve is configured to plot out, in a continuum, a pre-threshold curve, a threshold point of the physical perturbation beyond which the tissue damage is known to occur, and a post-threshold curve. The impact-response curve is configured to be dependent by the weight of the colliding dummy and the speed of the collision.

BRIEF DESCRIPTION OF THE DRAWINGS

FIG. 3A illustrates a schematic example of the model brain suspended by the suspension assembly; FIG. 3B shows a see-through illustration of a central cylindrical tube; and FIG. 3C depicts a plurality of vibration isolating plates.

FIG. 5A shows a schematic illustration of brain stem of the model brain; FIG. 5B shows a schematic view of the cerebellum; FIG. 5C shows a schematic view of the cerebrum; FIG. 5D shows a schematic view of a CSF sac with an intact base layer; and FIG. 5E shows a schematic view of a CSF sac in a hemispherical bowl shape without the base layer.

FIGS. 11A, 11C, 11E, and 11G show a schematic layout of a plurality of laser doppler vibrometers; FIGS. 11B and 11F show a schematic layout of a plurality of NIR cameras; and FIG. 11D shows a schematic example of the model brain.

FIG. 12A shows a schematic see-through view of a conduit assembly for a fiberoptic cable inside an arm of the immobile station and the central cylindrical tube; FIG. 12B illustrates a schematic example of the fiberoptic cable; and FIG. 12C shows a schematic depiction of an NIR light source.

FIG. 13A shows a schematic example of a rigid linear NIR endoscope; FIG. 13B shows a schematic example of an NIR endoscopic instrument; and FIG. 13 C shows a schematic example of the model brain attached to the suspension assembly which opens to a radial knob.

FIG. 16A shows a schematic see-through example of a compression gas chamber in a loaded configuration with a retracted piston head; FIG. 16B shows a schematic see-through example of the compression gas chamber in a discharged configuration with a protruded piston head; and FIG. 16C shows a rectangular block located in front of the piston head of the compression gas chamber.

DETAILED DESCRIPTION OF THE DRAWINGS

As described below, the present invention provides an impact-driven traumatic brain injury testing apparatus and methods of use. It is to be understood that the descriptions are solely for the purposes of illustrating the present invention, and should not be understood in any way as restrictive or limited. Embodiments of the present invention are preferably depicted with reference to FIGS. 1 to 16, however, such reference is not intended to limit the present invention in any manner. The drawings do not represent an actual dimension of devices, but illustrate the principles of the present invention.

Figure 1:
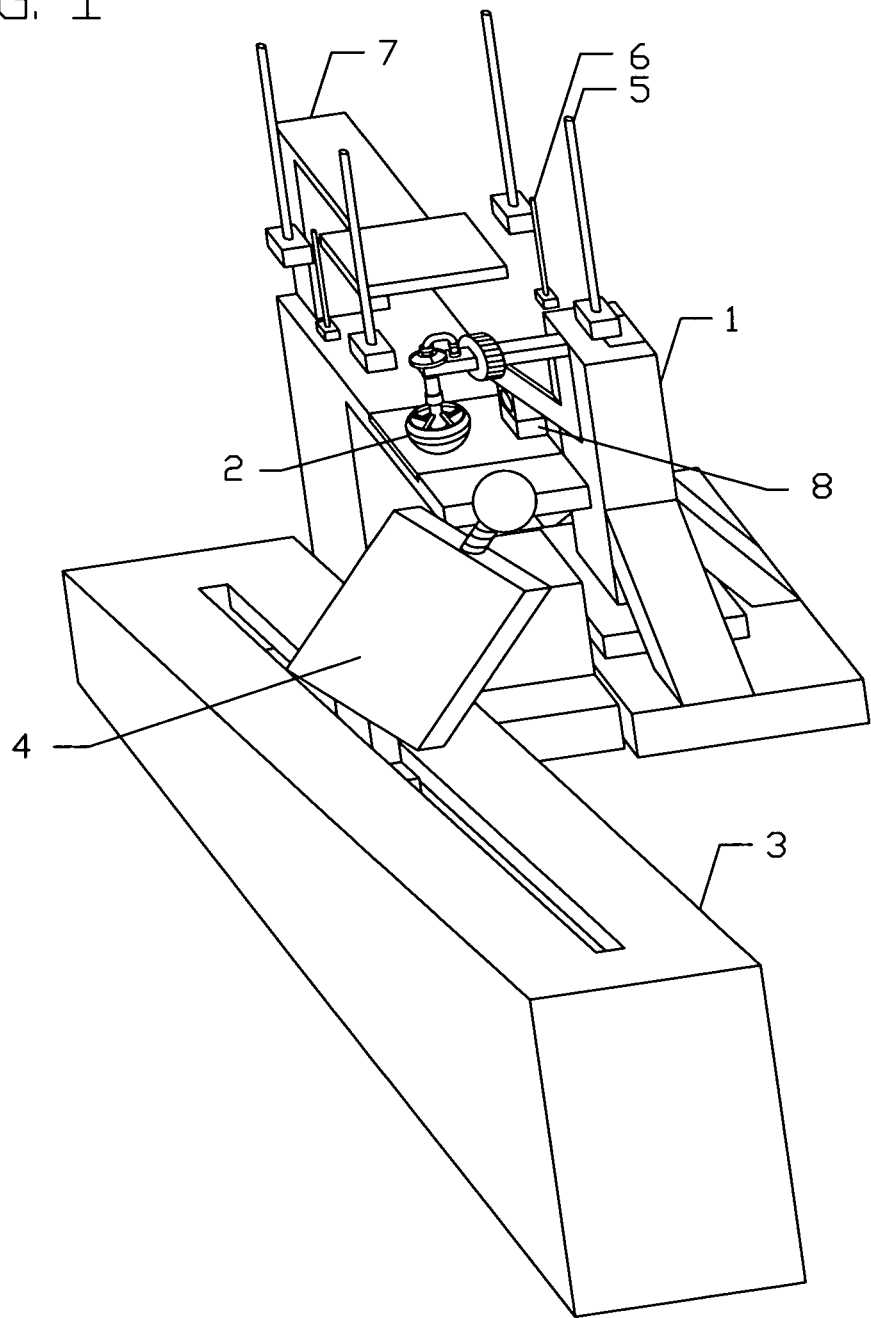
FIG. 1 shows a schematic presentation of a layout of the present invention.

FIG. 1 shows a schematic presentation of a layout of the present invention. An immobile station 1 vertically holds a model head 2 in suspension to which a colliding dummy 4 of a collision assembly is directed. The colliding dummy 4 is slidably housed in a collision propulsion assembly 3 of the collision assembly which is placed in parallel with the immobile station 1 and an X-ray fluoroscope 7 along a longitudinal axis. The model head 2 is suspended in a space where said model head 2 is monitored without hindrance by the X-ray fluoroscope 7, a plurality of laser doppler vibrometers 5, a plurality of near-infrared (NIR) cameras 6 and a video-camera 8.

Figure 2:
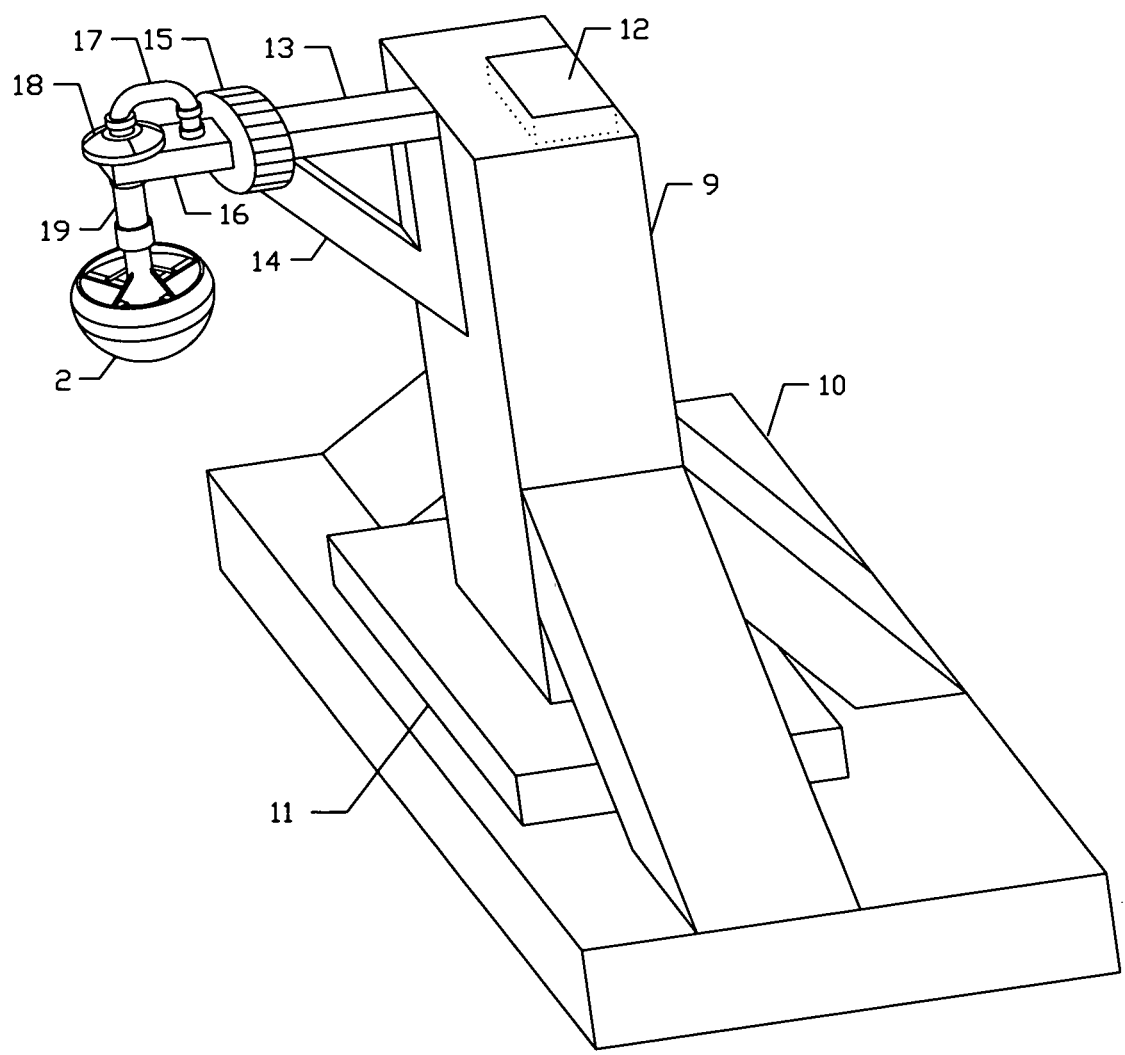
FIG. 2 shows a schematic illustration of a model head suspended by a suspension assembly which is connected to an immobile station.

FIG. 2 shows a schematic illustration of the model head 2 suspended by a suspension assembly having a central cylindrical tube 19 and a radial knob 18 which is connected to a proximal arm 16 extending from a distal arm 13. The distal arm 13 is stabilized by a chord 14 which is attached to a main tower 9 of the immobile station. In between the proximal and distal parts 16 and 13 of the arm, a rotatable radial wheel 15 is coaxially provided with a longitudinal axis of the arm. The rotatable radial wheel 15 is configured to rotate the proximal arm 16 to which the central cylindrical tube 19 of the suspension assembly is connected, which radially rotates an axis of the model head 2 about the longitudinal axis of the arm, thereby changing an angle of a vertical axis of the model head 2 to an impact of the colliding dummy 4. The radial knob 18 is fixedly attached to a proximal end of the central cylindrical tube 19 above the proximal arm 16, which is configured to horizontally rotate the central cylindrical tube 19 so as to horizontally rotate the mode head 2, thereby changing a circumferential area of the model head 2 to the impact of the colliding dummy 4. A top portion of the main tower 9 encloses an NIR light source 12 which is connected with a fiberoptic cable. The fiberoptic cable runs in a conduit inside the distal arm 13 and in a tubular conduit 17 to reach the central cylindrical tube 19. The main tower 9 of the immobile station is placed on a vibration isolation base 11 which is immobilized by a heavy weight base 10.

FIG. 3A illustrates a schematic example of the suspension assembly holding the model head 2. A vertex portion 29 of the model head 2 adjoins a circumferential rim 30 of the model head 2 which serves to establish an upper border of the model head. The circumferential rim 30 is attached to a circumferential rim 31 of the suspension assembly, which is configured to immovably hold the model head 2. A plurality of radial bottom chords 28 with a matching plurality of top chords are configured to connect the circumferential rim 30 to a proximal portion 27 of the central cylindrical tube. Referring to FIG. 2, the central cylindrical tube 19 comprises the proximal portion 27 connected to a mid portion 25. The mid portion 25 is connected to a distal portion 33 shown in FIG. 3B, which is insertably connected to the proximal arm 16. The distal portion 33 goes through an insertion site of the proximal arm 16 to get connected to the radial knob 18 and to the tubular conduit 17. The tubular conduit 17 is configured to be installed for a length outside the proximal arm 16 to reduce resonant vibration transmitted from a material of the proximal arm 16 and the distal portion 33 of the central cylindrical tube. A distal portion of the tubular conduit 17 then merges with an internal conduit disposed inside the proximal arm 16 which adjoins an internal conduit inside an internal cylinder 20 of the distal arm 13 of FIG. 2. The rotatable radial wheel 15 is configured to rotate about the internal cylinder 20. A plurality of vibration absorbing flanges 21~24 and 26 having an internal silicone gel liner is installed to tighten each connection junction and to isolate the vibration of the mechanical waves. Similarly, at a junction between the proximal arm 16 and the rotatable radial wheel 15, a plurality of stackable doughnut-shaped silicone gels is placed to isolate the vibration of the mechanical waves.

FIG. 3B shows a see-through illustration of the central cylindrical tube, comprising a bell-shaped proximal end 34 adjoining the proximal portion 27 configured to be in a bell-pipe shape. A bell-shaped space 35 of the bell-shaped proximal end 34 is configured to accommodate a trapezoidal configuration of a pons of the model brain. A cylindrical tubular space 36 is provided inside the mid portion 25, which adjoins a cylindrical tubular space 32 of the distal portion 33 of the central cylindrical tube. A plurality of vibration isolating plates 37 having a central doughnut hole 38 are shown in FIG. 3C, which are configured to be inserted in the cylindrical tubular space 36. All individual components of the suspension assembly are made of impact resistant polymers such as high density polyethylene and polycarbonate except for vibration absorbing flanges which are lined inside by the internal silicone gel.

Figure 4A:
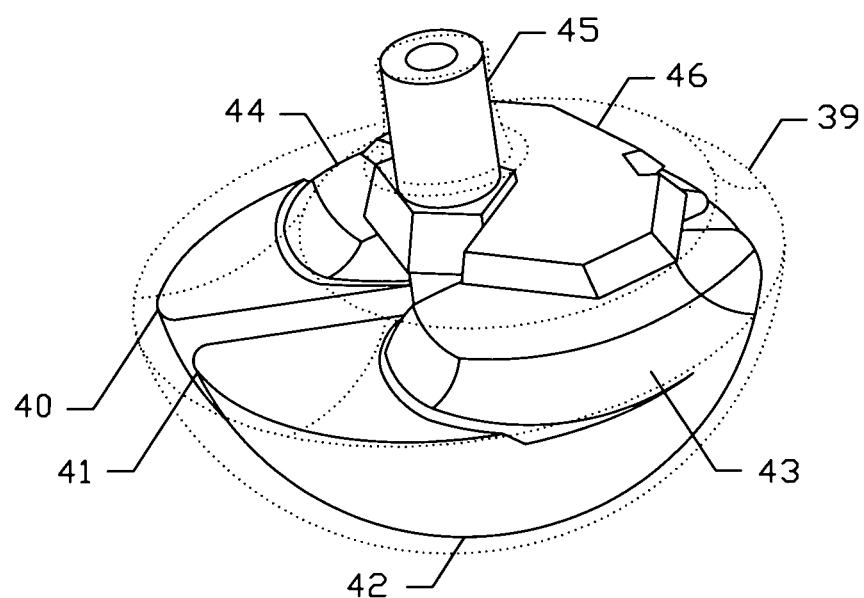
FIG. 4A depicts a schematic display of the model brain immersed in a cerebrospinal fluid (CSF) sac.
Figure 4B:
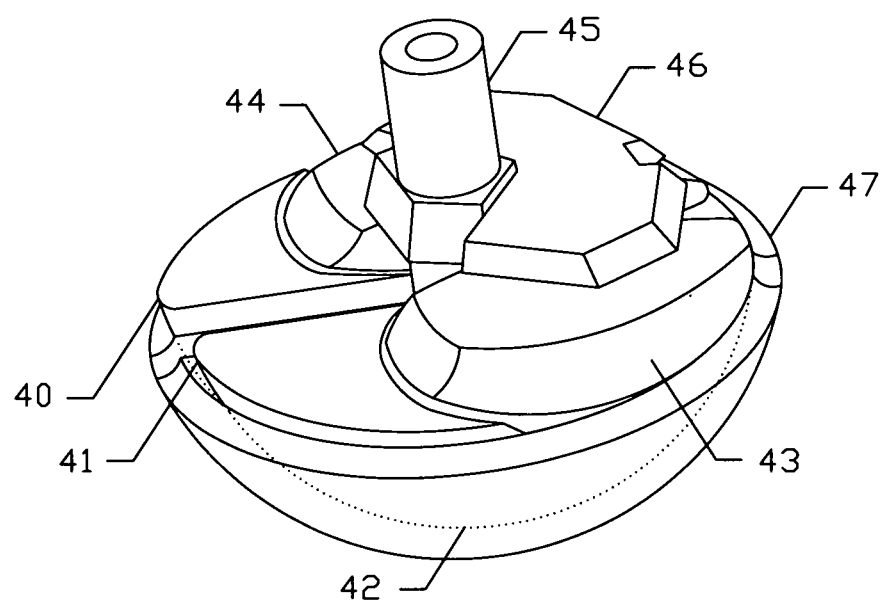
FIG. 4B shows the CSF sac covering a hemispherical portion of the model brain, while exposing a base portion of the model brain.

FIG. 4A depicts a schematic example of one configuration of the model brain immersed in a cerebrospinal fluid (CSF) sac 39. The model brain is configured to be placed upside down, so as to provide assessable regions for vibration of the model brain. Inside the CSF sac 39, a cerebrum 42 is configured to float in a CSF. The CSF sac 39 enclosably immerses a pair of frontal lobes 40 and 41, a pair of temporal lobes 43 and 44, a brain stem 45 and a cerebellum 46. FIG. 4B shows a schematic example of a second configuration of a CSF sac 47 enveloping the cerebrum 42 of the model brain, while exposing a base portion of the frontal lobes 40 and 41, the temporal lobes 43 and 44, the brain stem 45 and the cerebellum 46. The configuration of FIG. 4A provides a base portion of the CSF sac for measuring the vibration of the model brain, whereas the configuration of FIG. 4B allows exposed individual groups of the model brain to be directly assessed for the vibration.

FIGS. 5A-5E show schematic illustrations of nine geometric groups of the model brain. FIG. 5A shows a schematic illustration of the brain stem 45 in a cylindrical configuration having a central cylindrical tubular space 48. The brain stem 45 adjoins a corpus callosum 51 in a rectangular box configuration at a proximal portion and a pons 49 in a trapezoidal box configuration at a mid portion of said brain stem 45. Shown as 55 coming into a space 64 between two cerebral hemispheres in FIG. 5C, the corpus callosum 51 adjoins a medial surface of each cerebral hemisphere 40 and 41 of FIG. 5C, thus connecting two separate cerebral hemispheres. A posterior portion 50 of the pons 49 is configured to adjoin an anterior portion 54 of the cerebellum 46 shown in FIG. 5B. The cerebellum 46 of FIG. 5B is configured in an elliptical-disk shape and has an upper surface 52 and a lower surface 53. The cerebellum 46 is configured to detachably sit on a distal portion 58 and 61 of the temporal lobes. FIG. 5C shows a schematic view of the cerebrum which comprises the frontal lobes 40 and 41, the cerebrum 42, the temporal lobes 43 and 44, and a pair of occipital lobes 62 and 63. The base portion of each frontal lobe has a flat base 65 and 67 which is bordered by a semi-circular depression 66 and 68, respectively. Each temporal lobe 43 and 44 has a proximal portion 57 and 60, respectively. Each proximal portion 57 and 60 is free-ended and bordered by the semi-circular depression 68 and 66, respectively. The proximal portion 57 and 60 adjoins a mid portion 56 and 59 of the temporal lobes which in turn adjoins the distal portion 58 and 61, respectively. Each distal portion 58 and 61 of the temporal lobes merges with the occipital lobe 62 and 63, respectively.

FIG. 5D shows a schematic view of the CSF sac 39 which comprises a hemispherical bowl 73 and a base layer 74 covering the cerebrum and a base layer 75 covering or partitioning the cerebellum dependent on a configuration related to inclusion or exclusion of the cerebellum for the model brain. On the base layer 75, a bell-pipe shaped tubular portion 70 of the CSF sac is provided to accommodate the pons 49 of FIG. 5A. The bell-pipe shaped tubular portion 70 is bordered by an attachment ring 71. The attachment ring 71 and a tubular attachment portion 72 are configured to sealably adhere to an outer surface of the brain stem 45, thus producing a water tight configuration of the CSF sac 39. FIG. 5E shows a schematic view of the CSF sac 47 without the base layer, which comprises an outer membrane 76, an upper membrane 80 and an anterior mid membrane 78 and a posterior mid membrane 79. The upper membrane 80 is an extension from the outer membrane 76 to a circumferential edge 77 which is configured to sealably adhere to an outer circumference of the cerebrum. Both the anterior and posterior mid membranes 78 and 79 are configured to cover the space 64 between two cerebral hemispheres shown in FIG.

5C. The CSF sac 47 comprises a space made of the aforementioned membranes 76, 78, 79 and 80 and an outer surface of the cerebrum, in which a CSF is filled.

Figure 6A:
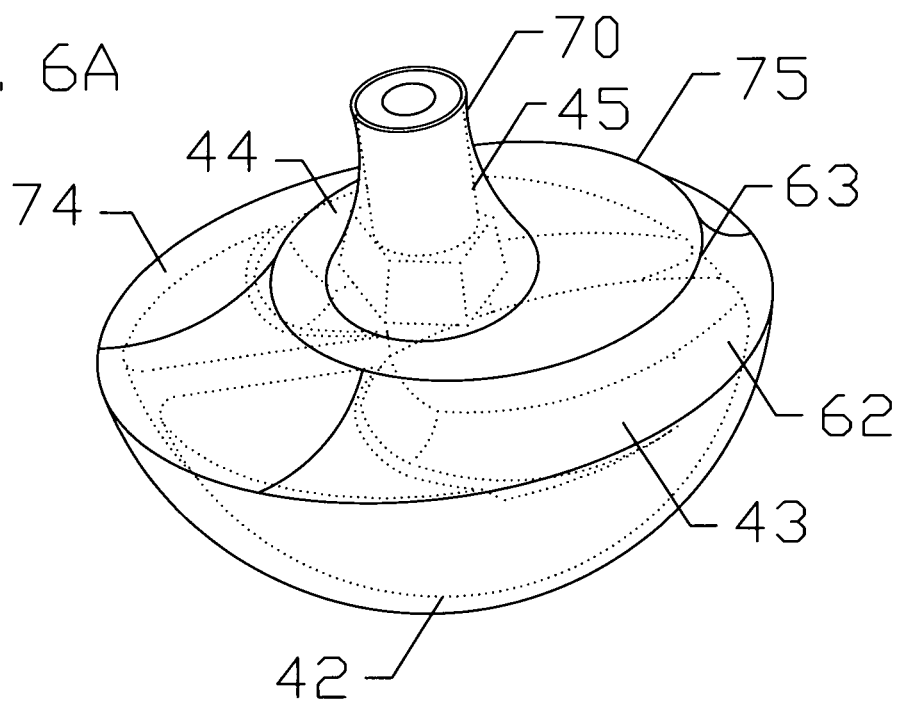
FIG. 6A shows a schematic drawing of the model brain without the cerebellum, encased by the CSF sac.
Figure 6B:
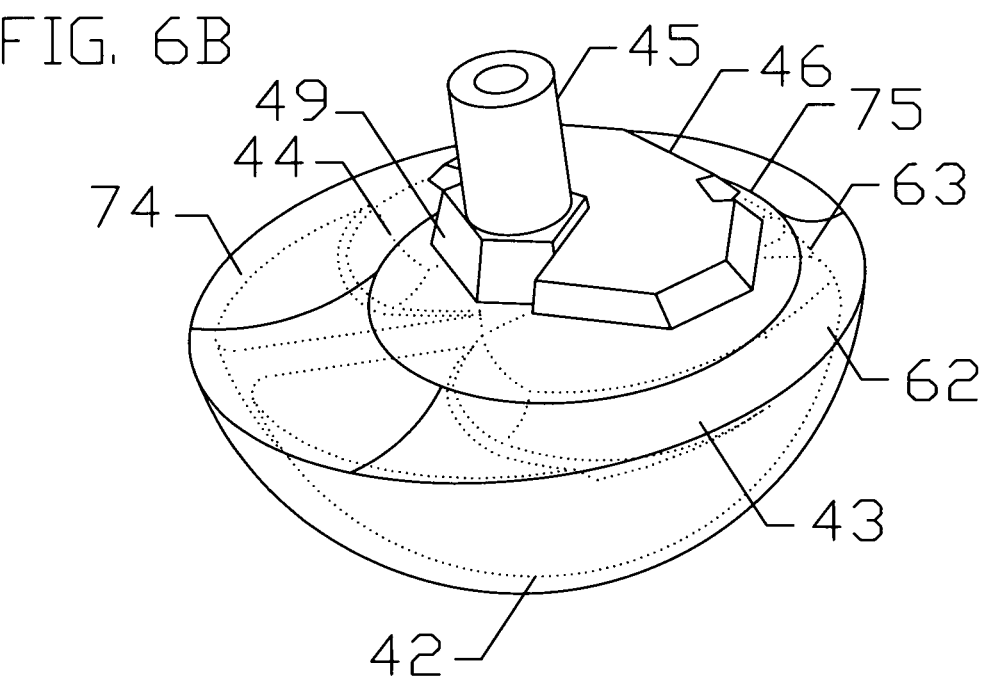
FIG. 6B shows a schematic view of the model brain with the cerebellum, encased by the CSF sac except for the cerebellum and the brain stem.

FIG. 6A shows a schematic drawing of the model brain without the cerebellum, encased by the CSF sac having the base layer 75 covering the temporal lobes 43 and 44. The occipital lobes 62 and 63 and the cerebrum 42, and the brain stem 45 are covered by the base layer 74 and the bell-pipe shaped tubular portion 70 of the CSF sac, respectively. FIG. 6B shows a schematic view of the model brain with the cerebellum 46. The cerebrum 42, and the occipital lobes 62 and 63 are covered by the base layer 74 and the temporal lobes 43 and 44 by the base layer 75, while exposing the brain stem 45, the pons 49 and the cerebellum 46. This particular configuration of partitioning the cerebellum and the brain stem from the cerebrum mimics a supratentorial membrane of a natural brain partitioning a brain space into a supratentorial space and an infratentorial space, which answers a question on differences in a kinetic response of the two models to the blunt trauma.

Figure 7A:
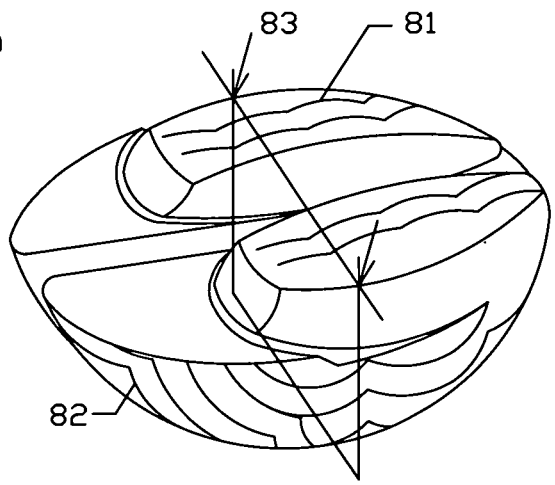
FIG. 7A shows presence of sulci on an outer surface of the model brain.
Figure 7B:
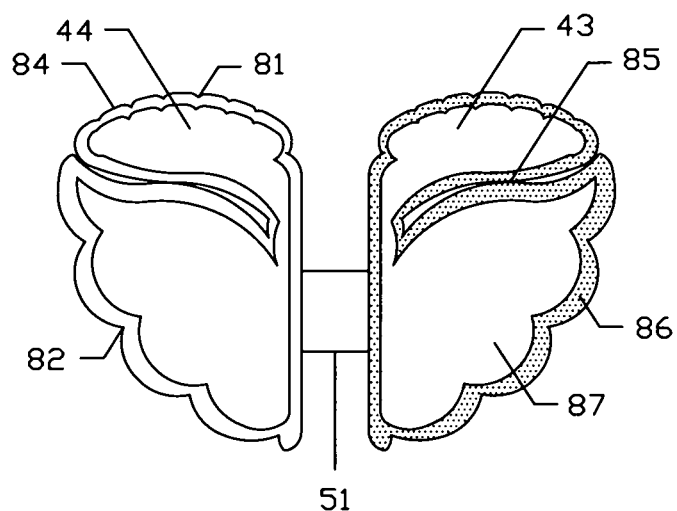
FIG. 7B shows a coronal sectional view of the model brain illustrating the sulci and gyri, and a temporal lobe which is free-ended on its lateral side but connected to the cerebrum on its medial side.
Figure 7C:
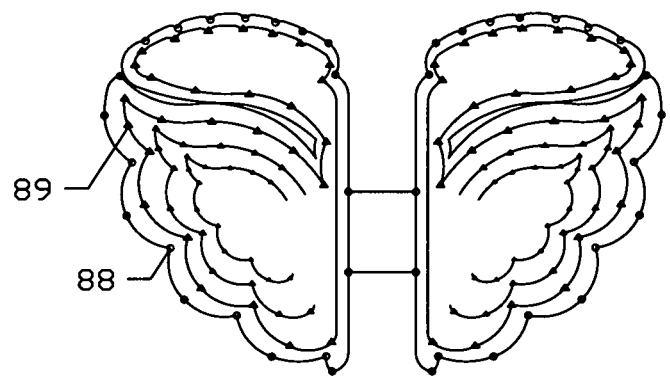
FIG. 7C shows a schematic example of imprinting of the sulci and gyri with radiopaque polymers on the outer surface and near-infrared (NIR) beads embedded inside the model brain.

FIG. 7A shows presence of sulci 81 and 82 on an outer surface of the model brain. FIG. 7B shows a coronal sectional view of the model brain at a coronal plane of 83 shown in FIG. 7A, illustrating the sulci 81 and 82 and gyri 84, and each temporal lobe 43 and 44 which is free-ended on its lateral side but connected to the cerebrum on its medial side along a Sylvian fissure 85. A gray matter portion of the cerebrum which is known to have a higher water content is shown as 86 and a white matter having a lower water content is designated as 87. Both cerebral hemispheres are connected to the corpus callosum 51 located in between the cerebral hemispheres. FIG. 7C shows a schematic example of imprinted radiopaque polymer line 88 of a surface of the sulci and gyri and NIR beads 89 embedded inside the model brain.

Figure 8A:
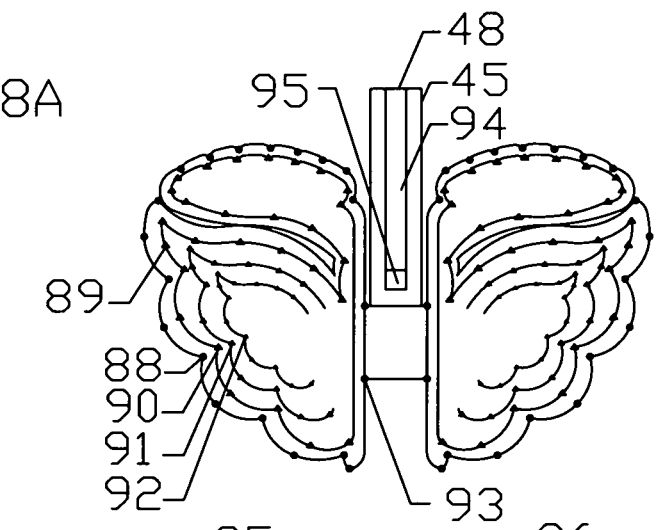
FIG. 8A illustrates a schematic coronal sectional view of the model brain with the imprinted radiopaque polymers and embedded NIR beads, and a fiberoptic cable placed inside a cylindrical tubular space.
Figure 8B:
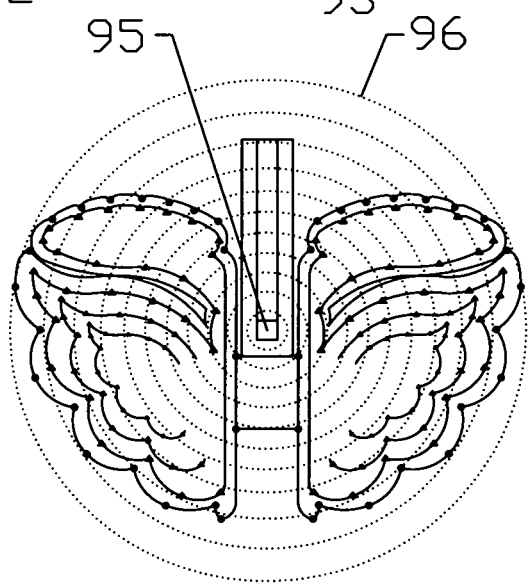
FIG. 8B shows a radial illumination of the model brain by an NIR light from a tip of the fiberoptic cable.
Figure 8C:
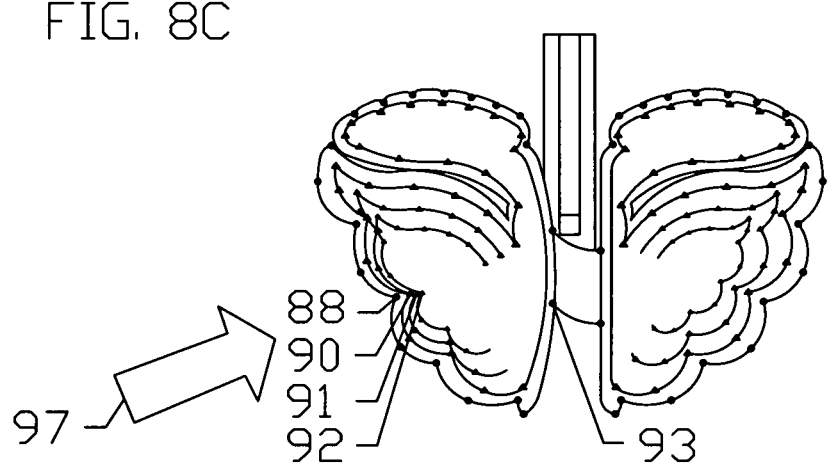
FIG. 8C illustrates a clustering of NIR beads inside the model brain upon an impact.

FIG. 8A illustrates a schematic coronal sectional view of the model brain with the imprinted radiopaque polymer lines 88 and 93, layered embedded NIR beads 89~92, and a fiberoptic cable 94 with a tip 95 placed inside the cylindrical tubular space 48 of the brain stem 45. FIG. 8B shows a radial illumination 96 of the model brain by an NIR light from the tip 95 of the fiberoptic cable. FIG. 8C illustrates a clustering of NIR beads 90~92 inside the model brain, and displacement of the radiopaque polymer lines 88 and 93 upon an impact 97. Upon the impact 97, the clustering of the NIR beads 90~92 results in a higher density of an emitted NIR light per a three-dimensional geographic area, which is captured and visualized in an NIR spectrum by the NIR camera 6 shown in FIG. 1. Changes of the NIR visualization reveals information on an internal deformation of the model brain. The displacement of the radiopaque polymer lines 88 and 93 is captured and visualized by the X-ray fluoroscope 7 shown in FIG. 1, which yields information of a surface deformation of the model brain.

Figure 9:
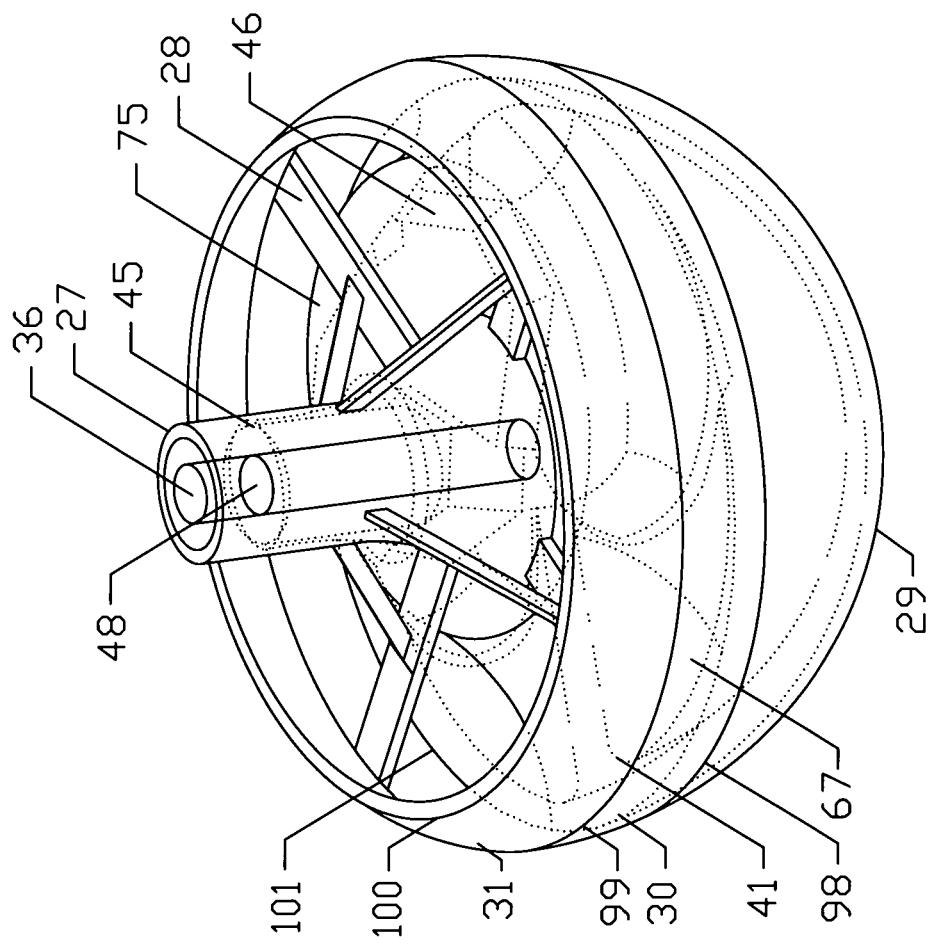
FIG. 9 shows a schematic view of a fully assembled model head with an upper circumferential rim attached to a part of the suspension assembly.

FIG. 9 shows a schematic view of a fully assembled model head with an upper circumferential rim attached to a part of the suspension assembly. The circumferential rim 30 of the model head which is substantially vertically adjoins the vertex portion 29 of the model head below and the circumferential rim 31 of the suspension assembly above said circumferential rim 30. A demarcation line 98 between the circumferential rim 30 and the vertex portion 29 is imprinted on a surface to correspond to a top level of the base portion 67 of the frontal lobe of cerebrum, indicating that the demarcation line 98 is the highest level of the cerebrum of the model head. A demarcation line 99 is seen at a junction between the circumferential rim 30 and the circumferential rim 31, which corresponds to an internal demarcation line 101. The circumferential rim 30 is proximally bordered by an upper border 100 which is provided in a configuration of an open circle. The internal demarcation line 101 corresponds to the base layer 75 of the CSF sac enclosing the cerebellum 46, indicating that the demarcations lines 99 and 101 are the highest level of the model brain except for the brain stem 45. The proximal portion 27 of the central cylindrical tube is configured to slidably enclose the brain stem 45 and the cylindrical tubular space 36 of the central cylindrical tube is configured to correspond to the cylindrical tubular space 48 of the brain stem. The radial bottom chord 28 with a matching top chord is installed above the internal demarcation line 101 so as to provide unhindered vibration and deformation of the model brain upon the impact. The circumferential rim 31 of the suspension assembly is bordered by a circumferential margin 101 which is configured to be smaller than the circumferential rim 31 so as to provide the circumferential rim 31 with a structural strength.

Figure 10:
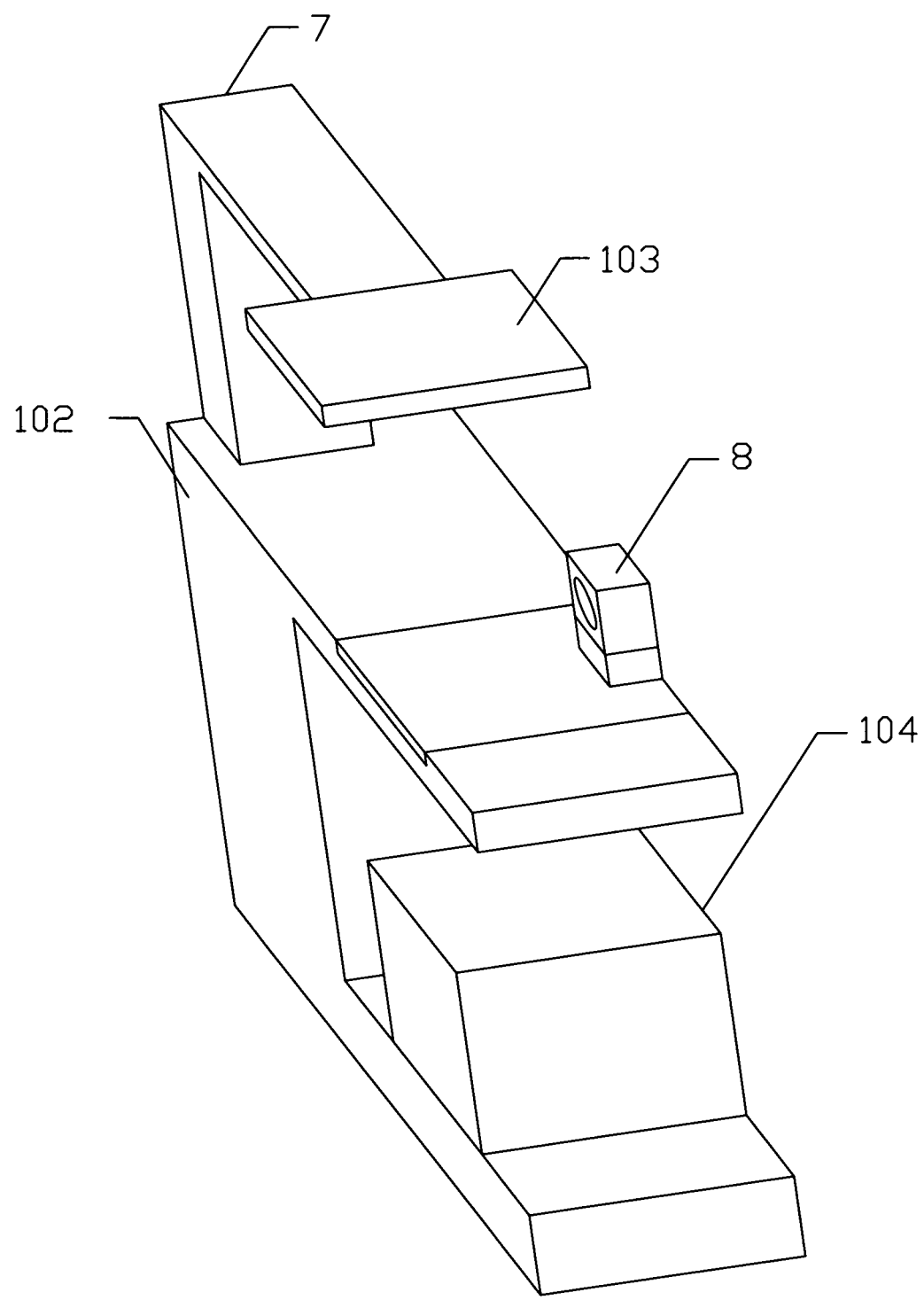
FIG. 10 illustrates an X-ray fluoroscope and a high-resolution and high-speed video-camera.

FIG. 10 illustrates the X-ray fluoroscope 7 and the video-camera 8, shown in FIG. 1. The X-ray fluoroscope 7 comprises a main instrument 102, a radiation source 104 and a flat panel X-ray detector 103. Referring to FIG. 1, the model head 2 is placed between the flat panel X-ray detector 103 and the radiation source 104 in a way said model head is also visually recordable by the video-camera 8. The X-ray fluoroscope 7 and the video-camera 8 are configured to measure external changes of the model head upon the impact.

FIGS. 11A~11G illustrates a schematic example of a layout of measurement of vibration and NIR imaging. FIGS. 11A, and 11C show a couple of laser doppler vibrometers 105 and 106 which are configured to send laser beams to and receive reflected laser beams from the frontal lobes 40 and 41 of FIG. 11D. Likewise, FIGS. 11E and 11G show the laser doppler vibrometers 107 and 108 which are configured to measure vibration of the occipital lobes 61 and 63 of FIG. 11D by sending and receiving the laser beams. FIGS. 11B and 11F show a schematic layout of a couple of NIR cameras 109 and 110, respectively, which are configured to detect an emitted NIR light from the model brain of FIG. 11D.

FIG. 12A shows a schematic see-through view of a conduit assembly for the fiberoptic cable which is connected to the NIR light source 12 shown in FIG. 12C. The distal arm 3 shown in FIG. 2 is configured to have the internal cylinder 20 which has the internal conduit 111 along the longitudinal axis of the distal arm 3. The internal conduit 111 is coaxially connected to a rotatable conduit 112 disposed inside the rotatable radial wheel 15 which in turn is connected to an internal conduit 113 of the proximal arm 16. The internal conduit 113 is configured to penetrate into an upper wall of the proximal arm 16 to get connected with the tubular conduit 17. The tubular conduit 17 in turn is connected to the cylindrical tubular space 36 of the suspension assembly via a conduit 114. The conduit 114 is configured to go through the radial knob 18 to get connected to the cylindrical tubular space 36. The vibration absorbing flange 23 above the radial knob 18 is configured to reversibly tighten the conduit 114. At the proximal portion 27 of the central cylindrical tube, the cylindrical tubular space 36 is coaxially connected to the cylindrical tubular space 48 of the brain stem. FIG. 12B illustrates a schematic example of the fiberoptic cable 115 which is connected to the NIR light source 12 of FIG. 12C. The fiberoptic cable 115 with a tip 116 is configured to be inserted through the conduit assembly shown in FIG. 12A to provide the model head 2 of FIG. 12A with an NIR light.

FIG. 13A shows a schematic example of a rigid linear NIR endoscope 119 with a proximal end 120 and a distal end 118. The distal end 118 serves an handle of the rigid linear NIR endoscope 119 and is configured to anchor said rigid linear NIR endoscope 119 to a separate suspension assembly (not shown). The rigid linear NIR endoscope 119 receives an NIR light from and sends back an emitted NIR light to an NIR endoscopic instrument 117 shown in FIG. 13B via a fiberoptic cable 115. The NIR endoscopic instrument 117 is placed in a separate, independent location outside the immobile station 1 shown in FIG. 1. The proximal end 120 of the rigid linear NIR endoscope is equipped with the fiberoptic cable 115 and a digital imaging sensor such as charge-coupled device or complimentary metal-oxide semiconductor and is configured to be wide-angled to broaden an area of reception of the emitted NIR light. The rigid linear NIR endoscope 119 is configured to be inserted through and tightened by the vibration absorbing flange 23 coaxially connected to the radial knob 18 to reach the cylindrical tubular space 48 of the brain stem shown in FIG. 12A.

Figure 14A:
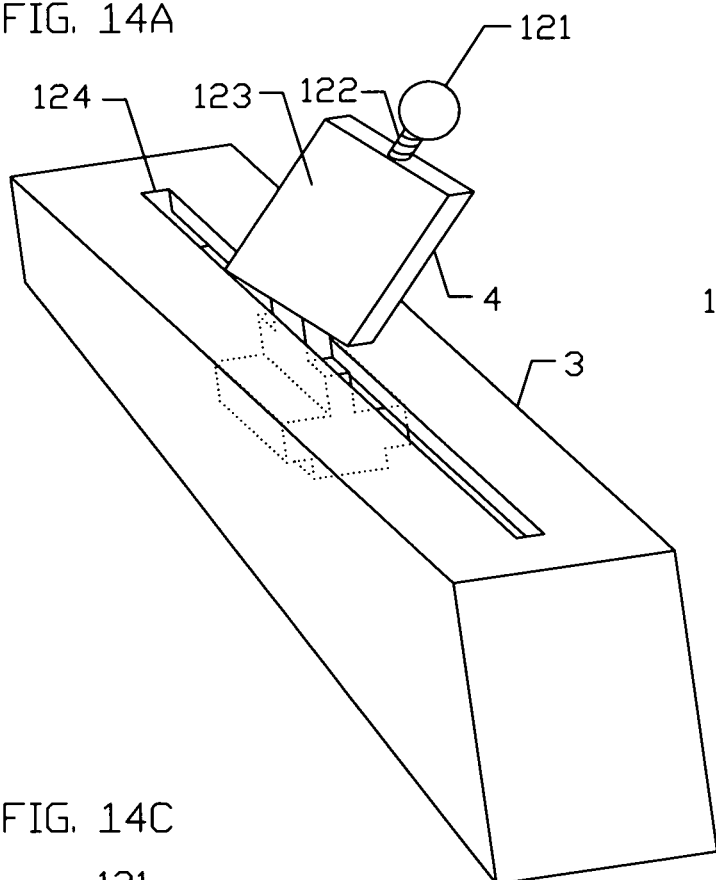
FIG. 14A illustrates a schematic layout of a collision assembly.
Figure 14B:
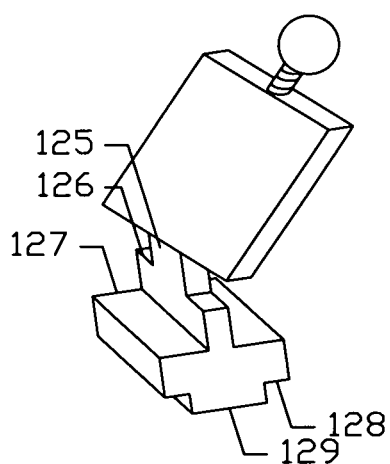
FIG. 14B shows a schematic example of a colliding dummy.
Figure 14C:
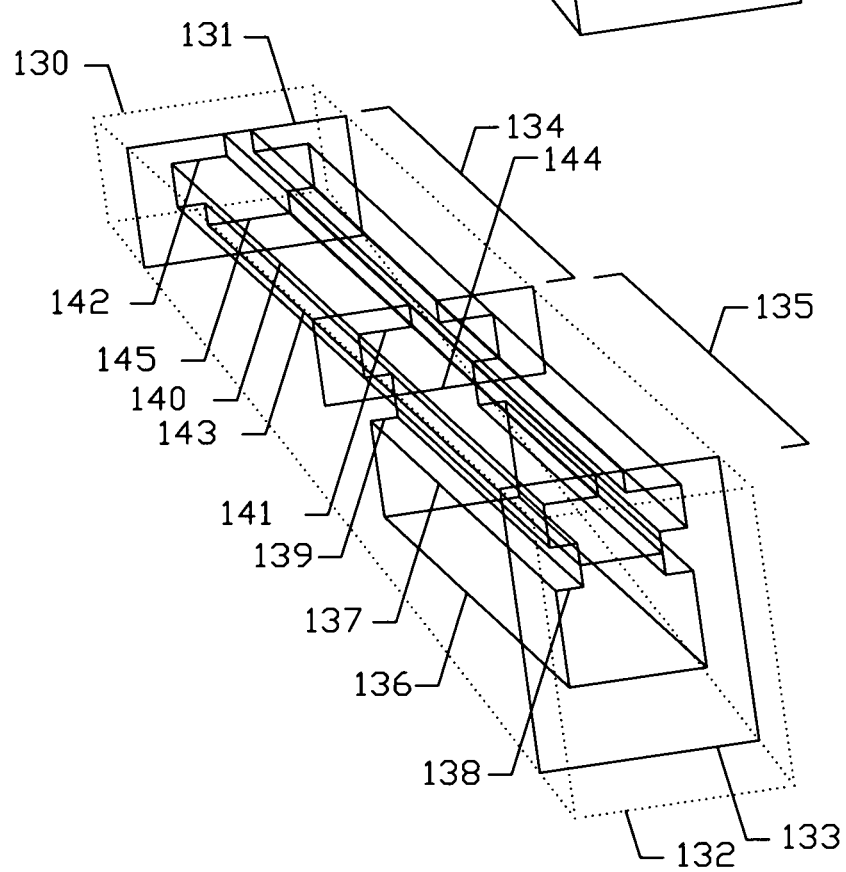
FIG. 14C shows a schematic see-through illustration of a collision propulsion assembly.

FIG. 14A illustrates a schematic layout of a collision assembly which comprises a colliding dummy 4 and a collision propulsion assembly 3. The colliding dummy 4 comprises a head 121, a neck 122 and a trunk 123 which is tilted to a side at an angle to an upper wall of the collision propulsion assembly 3. The upper wall of the collision propulsion assembly 3 comprises a linear slot 124 in a mid portion along a longitudinal axis of the collision propulsion assembly 3, which is configured to slidably carry the colliding dummy 4. Shown in FIG. 14B, the colliding dummy has a rail assembly below the trunk 123 which mates with a linear slot assembly of the collision propulsion assembly 3. The rail assembly comprises a vertical rail 126 connected to the trunk 123 via a vertical rail neck portion 125, a pair of horizontal rails 127 and 128, and a weight stabilizer 129 below the horizontal rails 127 and 128. FIG. 14C shows a schematic see-through illustration of the collision propulsion assembly. The collision propulsion assembly comprises a proximal wall 130 and a distal wall 132. The distal wall 132 is configured to be higher than the proximal wall 130 so as to make the upper wall of the collision propulsion assembly sloped downward from the distal wall 132 to the proximal wall 130. The linear slot assembly extends from a distal wall 133 located inside the distal wall 132 to a proximal wall 131, and comprises a driving portion 135 and a sliding portion 134. The driving portion 135 of the linear slot assembly is located above a lower space which is bordered by an upper wall 137 having a proximal end 139 and a distal end 138 and by a lower wall 136. The sliding portion 134 of the linear slot assembly extends from a distal end 141 to a proximal end 142 of a upper wall 140 covering a slot, and from a distal end 144 to a proximal end 145 of a lower wall 143 of the slot. The rail assembly shown in FIG. 14B is configured to slidably mate with the linear slot assembly shown in FIG. 14C.

Figure 15A:
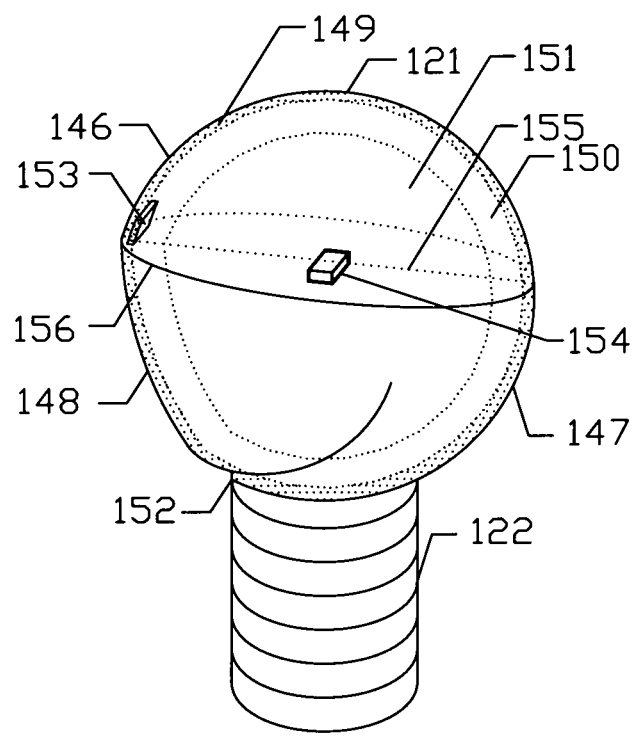
FIG. 15A shows a schematic see-through example of a colliding head of the colliding dummy.
Figure 15B:
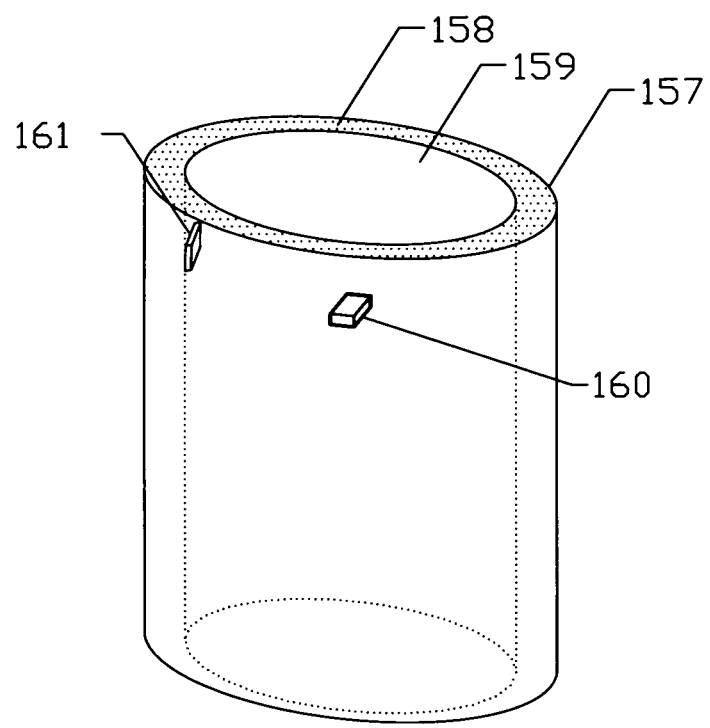
FIG. 15B shows a schematic see-through example of a colliding cylinder.

FIG. 15A shows a schematic see-through example of the head 121 of the colliding dummy. The head comprises a forehead portion 146, a back portion 147 and a face portion 148. A scalp layer 149 comprises an organosilicon polymer such as poly(dimethylsiloxane), which is configured to tightly encase a skull equivalent polymeric layer 150 made of a composite polymers such as poly(methyl methacrylate) mixed with methylmethacrylate. An internal globular mass 151 representing a natural brain is made of an elastomer such as polysiloxane, which is tightly encased by the skull equivalent polymeric layer 150. The head 121 is flexibly connected to the neck 122 at a junction 152. As a minimum for measurement of a kinetic response to an impact, a piezo-pressure sensor 153 is placed between the scalp layer 149 and the skull equivalent polymeric layer 150 at a site of the impact. A triaxial accelerometer 154 as a minimum is placed inside the internal globular mass 151 along a radial line 155 of a circle 156 where the impact is arranged to occur. FIG. 15B shows a schematic see-through example of a colliding cylinder 157 which comprises an outer polymeric layer 158 encasing an inner polymeric cylinder 159. A piezo-pressure sensor 161 and a triaxial accelerometer 160 as a minimum setup for measurement of the kinetic response to the impact are installed between the outer polymeric layer 158 and the inner polymeric cylinder 159 and in a mid portion of the inner polymeric cylinder, respectively.

FIG. 16A shows a schematic see-through example of a compression gas chamber 164 with a retracted piston head 162 enclosed in the driving portion 135 of the collision propulsion assembly and is connected to a hose 163 providing the compressed gas chamber 164 with compressed gas from a gas compressor (not shown). A rectangular block 165 is fixedly attached to a front of the piston head 162, which is configured to push forward the weight stabilizer 129 shown in FIG. 14B. FIG. 16B shows a schematic see-through example of the compression gas chamber 164 in a discharged configuration with a protruded piston head 162 and the rectangular block 165. FIG. 16C shows the rectangular block 165 aligned with the piston head 162 of the compression gas chamber 164.

It is to be understood that the aforementioned description of the apparatus and methods is simple illustrative embodiments of the principles of the present invention. Various modifications and variations of the description of the present invention are expected to occur to those skilled in the art without departing from the spirit and scope of the present invention. Therefore the present invention is to be defined not by the aforementioned description but instead by the spirit and scope of the following claims.

What is claimed is:

1. An impact-driven traumatic brain injury testing apparatus, comprising:
a model head immovably suspended by a suspension assembly, and a collision assembly;
the model head, provided in an upside down configuration having a vertex portion pointing downward and a base portion pointing upward, wherein the model head comprises a layered polymeric outer shell, a model brain comprising a hydrophilic polymer, and a cerebrospinal fluid (CSF) contained in a polymeric CSF sac, wherein the layered polymeric outer shell is equivalent to a scalp, a skull, and a meninges, wherein the layered polymeric outer shell encases the CSF sac and the model brain, wherein the model head is configured to expose a base portion of the model brain for non-contact measurement of vibration and deformation of said model brain upon a mechanical impact, wherein the model head is configured to be suspended in air within an imaging field of imaging devices for the non-contact measurement of the deformation of said model brain, and wherein the model head is placed in a configuration for linear collision with a colliding dummy of the collision assembly without hindrance;
the suspension assembly, provided in a configuration to immovably suspend the model head in air, wherein the suspension assembly is configured to releasably anchor a protective headgear which slidably encases the model head, wherein the suspension assembly comprises an attachment portion to which the model head is attached, wherein the suspension assembly comprises an immobile station and an arm connected to the attachment portion on one end of said arm and to the immobile station on the other end of said arm, wherein the suspension assembly is configured to be able to change an angle of a longitudinal axis of the model head and an area of the model head to be collided by the colliding dummy, wherein the suspension assembly is configured to reduce transmission of the vibration between the model head and said suspension assembly, and wherein the suspension assembly is configured to provide a tubular conduit for a cable to a portion of the model brain; and the collision assembly, provided in a gas-pressure driven configuration, wherein the collision assembly comprises the colliding dummy and a collision propulsion assembly, wherein the colliding dummy is configured with a rail assembly, wherein the collision propulsion assembly is configured with a linear slot assembly and a gas-pressure driving assembly, wherein the colliding dummy is configured to be linearly driven in the linear slot assembly by release of a gas from the gas-pressure driving assembly of the collision propulsion assembly, and wherein the colliding dummy comprises a head portion configured to acquire physical data of a mechanical impact to said head of said colliding dummy upon collision to the model head.

2. The impact-driven traumatic brain injury testing apparatus according to claim 1, wherein the model brain comprises:

the hydrophilic polymer, wherein the hydrophilic polymer is configured to retain water up to 85% of a weight of the model brain, wherein the hydrophilic polymer solubilized in water is configured to transmit an non-infrared (NIR) light, wherein the hydrophilic polymer in a solid gel phase is configured to be deformable by the mechanical impact, and wherein the hydrophilic polymer in the solid gel phase is configured to vibrate upon the mechanical impact; and a plurality of NIR dye beads, provided in a granular configuration, wherein an NIR bead comprises a solvent and water soluble polymer impregnated with an NIR dye, wherein the NIR dye is solvent soluble but not water soluble, wherein the NIR beads are configured to be three-dimensionally distributed in the hydrophilic polymer, wherein the NIR beads are configured to emit a secondary NIR light upon excitation by a primary NIR light, and wherein the NIR beads are configured to provide visual data in an NIR spectrum under an NIR camera of a dynamic internal deformation of the model brain upon the mechanical impact.

3. The impact-driven traumatic brain injury testing apparatus according to claim 1, wherein the model brain further comprises:

nine geometric groups of the model brain, wherein the nine geometric groups comprise an opposing pair of one-half cerebral hemispheres, a pair of temporal lobes having an elongated trapezoidal configuration located above the one-half cerebral hemispheres, a pair of occipital lobes adjoining a distal part of each temporal lobe and located distal to the one-half hemispheres, a corpus callosum in a box configuration adjoining a medial surface of each one-half hemisphere, a brain stem distally adjoining the corpus callosum and a cerebellum in an ellipsoidal disk configuration, wherein the temporal lobe is configured with a free end on a lateral border of said temporal lobe, wherein the brain stem is configured with an upper cylindrical portion, a trapezoidal portion and a lower cylindrical portion, wherein the upper cylindrical portion of the brain stem comprises a cylindrical tubular space, wherein the cylindrical tubular space of the brain stem is configured to accommodate a proximal end of the cable delivering the NIR light, wherein a posterior portion of the trapezoidal portion is configured to be connected with an anterior portion of the cerebellum, wherein the nine geometric groups are configured to be interconnected with each other group, wherein the nine geometric groups are configured to be independently movable from each other, wherein a base portion of the cerebral hemispheres, the temporal lobes, the occipital lobes and the cerebellum is configured to generate the vibration upon the mechanical impact, and wherein the vibration of the base portion is configured to be detected by a plurality of laser doppler vibrometers so as to provide dynamic vibration data of the model brain upon the mechanical impact; and a plurality of raised linear convolutions, provided in a semi-cylindrical configuration, wherein the raised linear convolution is made on an outer surface of the one-half hemispheres, the temporal lobes, the occipital lobes and the cerebellum, wherein the raised linear convolution is configured with an apical longitudinal line in a mid portion of said raised linear convolution, wherein the raised linear convolution is configured to form a valley with the other adjacent raised linear convolution along a longitudinal lateral edge of said raised linear convolution, wherein the apical longitudinal line and the valley of the raised linear convolution are imprinted with a linear radiopaque thermoplastic polymer, wherein the apical longitudinal line and the valley imprinted with the radiopaque thermoplastic polymer are configured to provide visual data under an X-ray fluoroscope of a dynamic surface deformation of the model brain upon the mechanical impact.

4. The impact-driven traumatic brain injury testing apparatus according to claim 3, wherein the brain stem of the model brain of the model head further comprises:

a cylindrical portion, and a trapezoidal portion adjoining the cylindrical portion at a right angle, wherein the cylindrical portion of the brain stem comprises the cylindrical tubular space, wherein the cylindrical tubular space of said cylindrical portion is configured to accommodate a proximal end of the cable for transmitting the NIR light to the portion of the model brain.

5. The impact-driven traumatic brain injury testing apparatus according to claim 3, wherein the model brain of the model head further comprises:

a plurality of raised linear convolutions, wherein each raised linear convolution is provided in a semi-cylindrical configuration, wherein the raised linear convolution is configured to outwardly protrude from an outer surface of a portion of the model brain, wherein the raised linear convolution is configured with an apical longitudinal line in a mid portion of said raised linear convolution, wherein two adjoining raised linear convolutions are configured to form a valley between said two raised linear convolutions, wherein the apical longitudinal line and the valley are imprinted with a linear radiopaque thermoplastic polymer, respectively, and wherein the radiopaque thermoplastic polymer of the apical longitudinal line and of the valley is configured to provide visual data under an X-ray fluoroscope of a dynamic surface deformation of the model brain upon the mechanical impact.

6. The impact-driven traumatic brain injury testing apparatus according to claim 1, wherein the CSF comprises a liquid and a polymer dispersed in said liquid so as to achieve a viscosity of 0.7~1.0 milliPascal-second.

7. The impact-driven traumatic brain injury testing apparatus according to claim 1, wherein the attachment portion of the suspension assembly comprises:
   a circumferential rim immovably connected to a central cylindrical tube, and a radial knob;
   the circumferential rim, provided in a circular configuration, wherein the circumferential rim is configured to be rotatably and removably attached to a corresponding circumferential rim of the model head, and wherein the circumferential rim is made of an impact resistant polymer;
   the central cylindrical tube, provided in a cylindrical tubular configuration, wherein the central cylindrical tube is configure to provide the circumferential rim with structural strength, wherein a proximal portion of the central cylindrical tube is configured to insertably accommodate the brain stem of the model brain, wherein a cylindrical tubular space of the central cylindrical tube is configured to be coaxially connected with the cylindrical tubular space of the brain stem, wherein a distal portion of the central cylindrical tube is configured to be connected to a proximal arm of the suspension assembly, wherein the cylindrical tubular space of the central cylindrical tube is configured to serve as the tubular conduit for the cable, wherein the central cylindrical tube is configured to have a plurality of doughnut-shaped vibration isolation plates inside said central cylindrical tube, wherein an attachment junction of the central cylindrical tube with an adjacent tubular structure is fastened by a vibration absorbing flange, and wherein the central cylindrical tube is made of the impact resistant polymer; and
   the radial knob, provided in a horizontally rotatable configuration, wherein the radial knob is configured to get connected to a distal end of the central cylindrical tube, and wherein the radial knob is configure to coaxially rotate the central cylindrical tube connected to the circumferential rim of the suspension assembly so as to rotatably change the area of the model head about the longitudinal axis of said model head for the mechanical impact.

8. The impact-driven traumatic brain injury testing apparatus according to claim 1, wherein the immobile station of the suspension assembly comprises:
   a main tower supported by a vibration isolating base, and a heavy weight base;
   the main tower, provided in a rectangular configuration, wherein the main tower is configured to support the arm of the suspension assembly, wherein the main tower is configured to provide the arm with the tubular conduit for the cable, wherein the main tower is configured to reduce vibration transmitted from the arm, and wherein the main tower is configured to house instruments;
   the vibration isolation base, provided in a multi-layered configuration, wherein the vibration isolation base comprises a plurality of vibration isolating polymeric layers, and wherein the vibration isolation base is configured to isolate the main tower from the ground for to and fro vibration; and
   the heavy weight base, provided in a rectangular configuration, wherein the heavy weight base is configured to immobilize the immobile station.

9. The impact-driven traumatic brain injury testing apparatus according to claim 1, wherein the arm of the suspension assembly comprises:
   a proximal arm, a rotatable radial wheel, and a distal arm;
   the proximal arm, wherein a proximal portion of the proximal arm is configured to get connected with the distal portion of the central cylindrical tube so as to hold up the central cylindrical tube of the suspension assembly in air, wherein a distal end of the proximal arm is configured to get immovably connected to the rotatable radial wheel, and wherein the proximal arm is configured to provide the tubular conduit for the cable;
   the rotatable radial wheel, provided in a vertically rotatable configuration, wherein an axis of rotation of the rotatable radial wheel is configured to be at a right angle to an axis of rotation of the radial knob connected to the distal end of the central cylindrical tube, wherein the rotatable radial wheel is immovably connected to the distal end of the proximal arm, wherein the rotatable radial wheel is configured to rotate about an internal cylinder of the distal arm, wherein rotation of the rotatable radial wheel is configured to change the angle of the longitudinal axis of the model head for the mechanical impact, and wherein the rotatable radial wheel is configured to provide the tubular conduit for the cable in a center of said rotatable wheel; and
   the distal arm, wherein the internal cylinder of the distal arm is configured to be slidably inserted in the rotatable radial wheel, wherein a distal end of the distal arm is immovably fixated to the main tower of the immobile station, and wherein the distal arm is configured to provide the tubular conduit for the cable.

10. The impact-driven traumatic brain injury testing apparatus according to claim 1, wherein the collision assembly comprises:
    the colliding dummy, wherein the colliding dummy is configured to vary in weight, and wherein the colliding dummy is configured to be tilted at an angle to the linear slot of the collision propulsion assembly;
    the collision propulsion assembly, provided in a linear box configuration, wherein a proximal end wall is configured to be shorter than a distal end wall so as to be sloped in a downward direction along a direction of propulsion, wherein the linear slot assembly is configured to accommodate the rail assembly of the colliding dummy so as to let said rail assembly slide in said linear slot assembly, wherein the gas-pressure driving assembly comprises a compression gas chamber with a piston, wherein the gas-pressure driving assembly is enclosed in a rear section of the collision propulsion assembly, wherein the piston of the gas-pressure driving assembly is configured to push the rail assembly of the colliding dummy forward upon release of a compressed gas from the compression gas chamber, and wherein the release of the gas from the compression gas chamber is configured to vary so as to vary a speed of forward sliding movement of the colliding dummy.

11. A method of using the impact-driven traumatic brain injury testing apparatus according to claim 1, comprising;
    providing an impact-driven traumatic brain injury testing apparatus, comprising a model head immovably suspended by a suspension assembly, and a collision assembly;

placing the model head suspended by the suspension assembly in an imaging field of an X-ray fluoroscope, a plurality of laser doppler vibrometers, a plurality of near-infrared (NIR) cameras and a conventional video-camera;

filling up a compression gas chamber with a compressed gas by a gas compressor and loading a piston of the compression gas chamber in a firing position;

positioning a colliding dummy in front of the loaded piston of the compression chamber of the collision assembly;

turning on a plurality of the laser doppler vibrometers aiming at a base portion of a model brain encased in the model head and starting to measure vibration of the base portion of the model brain before an impact of the colliding dummy to the model head;

providing the model brain with a primary NIR light of an intensity to emit a secondary NIR light from a plurality of NIR beads three-dimensionally distributed in the model brain to a surface of the mode brain;

turning on a plurality of the NIR cameras and starting to visualize the model brain in an NIR spectrum before the impact of the colliding dummy to the model head;

turning on the X-ray fluoroscope and starting to visualize a plurality of radiopaque lines disposed on the surface of the model brain before the impact of the colliding dummy to the model head;

turning on the video-camera to begin recording the model head before the impact of the colliding dummy to the model head;

turning on measuring devices installed in the colliding dummy before the impact of the colliding dummy to the model head;

releasing the compressed gas from the compression gas chamber and pushing forward the piston so as to move forward the colliding dummy along a linear slot assembly of the collision assembly and to let a head of said colliding dummy collide the model head;

measuring and recording continuously the vibration of the base portion of the model brain by a plurality of the laser doppler vibrometers;

simultaneously visualizing and recording continuously the secondary NIR light emitted from a plurality of the NIR beads in the model brain;

simultaneously obtaining and recording continuously fluoroscopic visualization of a plurality of the radiopaque lines disposed on the surface of the model brain;

simultaneously visualizing and recording continuously a visual event of the impact of the colliding dummy to the model head by the video-camera;

simultaneously measuring and recording data from the measuring devices of the colliding dummy upon the impact of the colliding dummy to the model head;

applying a time series analysis and a multiple regression analysis as a minimum set of analysis on a set of digitized and calculable data of the vibration of the base portion of the model brain, of the secondary NIR light emitted from a plurality of the NIR beads in the model brain, of fluoroscopic visualization of a plurality of the radiopaque lines disposed on the surface of the model brain, of the visual event of the impact of the colliding dummy to the model head and from the measuring devices of the colliding dummy; and plotting out an impact-response curve between a force of the impact and a degree of a measurable physical perturbation of the model head deduced from the set of digitized and calculable data of the vibration and the deformation of the model head, wherein the impact-response curve comprises a pre-threshold curve, a threshold point for a tissue damage, and a post-threshold curve.

* * * * *